United States Patent
Wu et al.

(10) Patent No.: US 11,683,076 B2
(45) Date of Patent: Jun. 20, 2023

(54) DATA TRANSMISSION METHOD AND APPARATUS, AND SYSTEM

(71) Applicant: HUAWEI TECHNOLOGIES CO., LTD., Guangdong (CN)

(72) Inventors: Ye Wu, Shanghai (CN); Huangping Jin, Shanghai (CN); Wei Han, Shanghai (CN); Xiaoyan Bi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/703,607

(22) Filed: Dec. 4, 2019

(65) Prior Publication Data

US 2020/0106491 A1  Apr. 2, 2020

Related U.S. Application Data

(63) Continuation of application No. PCT/CN2018/092023, filed on Jun. 20, 2018.

(30) Foreign Application Priority Data

Jul. 26, 2017 (CN) .......................... 201710619655.0
Sep. 18, 2017 (CN) .......................... 201710843482.0

(51) Int. Cl.
*H04B 7/0417* (2017.01)
*H04B 7/0456* (2017.01)

(52) U.S. Cl.
CPC ......... *H04B 7/0417* (2013.01); *H04B 7/0456* (2013.01)

(58) Field of Classification Search
CPC .......................... H04B 7/0417; H04B 7/0456
(Continued)

(56) References Cited

U.S. PATENT DOCUMENTS 8,649,423 B2    2/2014  Park et al.
2008/0232503 A1*  9/2008  Kim ..................... H04B 7/0456
                                                          375/267
(Continued)

FOREIGN PATENT DOCUMENTS

CN    101257367 A    9/2008
CN    102244559 A    11/2011
(Continued)

OTHER PUBLICATIONS

R1-162697; Samsung; Discussions on open and semi-open loop transmission in eFD-MIMO; 3GPP TSG RAN WG1 Meeting #84bis; Busan, Korea, Apr. 11-15, 2016; Agenda item:7.3.3.3; total 5 pages.
(Continued)

*Primary Examiner* — Wednel Cadeau
(74) *Attorney, Agent, or Firm* — Leydig, Voit & Mayer, Ltd.

(57) ABSTRACT

This application provides a data transmission method, so that data transmission reliability can be improved. The method includes: receiving, by the terminal device, a plurality of reference signals used for channel measurement; and sending, by the terminal device, a plurality of pieces of first indication information based on the at least one reference signal and a transmission scheme on which CSI feedback is based, where the plurality of pieces of first indication information are used to indicate x target precoding matrices, at least one of the plurality of pieces of first indication information is used to indicate one target precoding matrix, and the x target precoding matrices are determined based on the plurality of precoding matrices, where x is a quantity of target precoding matrices that need to be fed back, and x is an integer greater than 1.

24 Claims, 9 Drawing Sheets

(58) Field of Classification Search
USPC .......................................................... 375/267
See application file for complete search history.

(56) References Cited

U.S. PATENT DOCUMENTS

| | | | |
|---|---|---|---|
| 2010/0027713 | A1 | 2/2010 | Huang et al. |
| 2011/0069773 | A1* | 3/2011 | Doron .................. H04B 7/0417 |
| | | | 375/267 |
| 2011/0170498 | A1 | 7/2011 | Liu et al. |
| 2013/0064207 | A1 | 3/2013 | Wang et al. |
| 2013/0077523 | A1 | 3/2013 | Ko et al. |
| 2013/0336280 | A1* | 12/2013 | Nordstrom ........ H04W 72/0446 |
| | | | 370/330 |
| 2014/0185699 | A1 | 7/2014 | Zhang et al. |
| 2014/0241274 | A1 | 8/2014 | Lee et al. |
| 2016/0301454 | A1 | 10/2016 | Nayeb Nazar et al. |
| 2016/0301455 | A1* | 10/2016 | Nammi ................ H04B 7/0645 |
| 2020/0119850 | A1* | 4/2020 | Gao ...................... H04L 5/0007 |
| 2020/0145075 | A1* | 5/2020 | Hao ...................... H04W 72/23 |

FOREIGN PATENT DOCUMENTS

| | | |
|---|---|---|
| CN | 102638337 A | 8/2012 |
| CN | 102714566 A | 10/2012 |
| CN | 104144007 A | 11/2014 |
| CN | 104202276 A | 12/2014 |
| CN | 106537814 A | 3/2017 |
| CN | 106559182 A | 4/2017 |
| CN | 104025470 B | 9/2018 |
| EP | 1699145 A2 | 9/2006 |
| EP | 3131213 A1 | 2/2017 |
| JP | 2013501409 A | 1/2013 |
| JP | 2014514875 A | 6/2014 |
| JP | 2017515344 A | 6/2017 |
| WO | 2010107365 A2 | 9/2010 |
| WO | 2011020235 A1 | 2/2011 |
| WO | 2016131487 A1 | 8/2016 |
| WO | 2017050086 A1 | 3/2017 |
| WO | WO-2017050086 A1 * | 3/2017 ........... H04L 1/0675 |

OTHER PUBLICATIONS

R1-1702204; Intel Corporation; Further discussion on NR CSI acquisition signaling; 3GPP TSG RAN WG1 #88; Athens, Greece, Feb. 13-17, 2017; Agenda item: 8.1.2.3.1; total 5 pages.

InterDigital Communications, LLC,"Study of Open Loop MIMO using UE Specific RS",3GPP TSG RAN WG1 Meeting #65 R1-111350,Spain, Barcelona, May 9-13, 2011,total 5 pages.

Zte,"Simulation results of test case 1 of DL-BF framework",3GPP TSG RAN WG4 #54 R4-100301,San Francisco, USA, Feb. 22-26, 2010,total 4 pages.

R1-1707947; Samsung; PRB bundling for NR DMRS; 3GPP TSG RAN WG1 Meeting #89; Hangzhou, P.R. China May 15-19, 2017; Agenda item:7.1.2.1.6; total 4 pages.

NEC,"On network resources and UE transmission configurations for grant-free access",3GPP TSG RAN WG1 NR Ad-Hoc Meeting #02 R1-1710963,Qingdao, China, Jun. 27-30, 2017,total 4 pages.

Samsung,"Views on EPDCCH simulation assumptions",3GPP TSG-RAN WG4 RAN4 #66bis R4-131380,Chicago, IL, US, Apr. 15-19, 2013,total 4 pages.

R1-1711011; Ericsson; On PRB bundling; 3GPP TSG-RAN WG1 #89ah-NR; Qingdao, China, Jun. 27-30, 2017; Agenda Item:5.1.2.1.5; total 6 pages.

Samsung,"EB/FD-MIMO ad hoc minuets",3GPP TSG-RAN WG4 Meeting #79 R4-164753,Nanjing, China, May 23-27, 2016,total 15 pages.

R2-1707187; 3GPP TS 38.331 3GPP TS 38.331 V0.0.4 (Jun. 2017),3rd Generation Partnership Project;Technical Specification Group Radio Access Network;NR;Radio Resource Control (RRC);Protocol specification(Release 15 ), total 22 pages.

R1-1708672; Ericsson; On DL PRB bundling; 3GPP TSG-RAN WG1 #89; Hangzhou, China, May 15-19, 2017; Agenda Item:7.1.2.1.6; total 6 pages.

"Semi-open-loop MIMO with beamformed CSI-RS," 3GPP TSG RAN WG1 Meeting #87, Reno, USA, R1-1612702, pp. 1-3, 3rd Generation Partnership Project, Valbonne, France (Nov. 14-18, 2016).

* cited by examiner

DATA TRANSMISSION METHOD AND APPARATUS, AND SYSTEM

CROSS-REFERENCE TO RELATED APPLICATIONS

This application is a continuation of International Application No. PCT/CN2018/092023, filed on Jun. 20, 2018, which claims priority to Chinese Patent Application No. 201710843482.0, filed on Sep. 18, 2017, and Chinese Patent Application No. 201710619655.0, filed on Jul. 26, 2017. All of the aforementioned patent applications are hereby incorporated by reference in their entireties.

TECHNICAL FIELD

This application relates to the communications field, and more specifically, to a data transmission method and apparatus, and a system.

BACKGROUND

Massive multiple-input multiple-output (massive multiple-input multiple-output, Massive MIMO) is recognized in the industry as one of key technologies of the 5th generation (5th generation, 5G) mobile communications. To avoid interference between multiple users and improve signal quality, precoding may usually be used to process a signal, thereby implementing spatial multiplexing (spatial multiplexing), and greatly increasing spectrum utilization.

A precoding technology is usually used in a MIMO system to improve a channel. However, when channel conditions rapidly change or when channel state information (channel state information, CSI) cannot be obtained in other cases, a relatively accurate precoding matrix cannot be obtained. Therefore, a to-be-transmitted signal obtained through precoding processing cannot be successfully demodulated by a receive end, causing deterioration in quality of a received signal.

To improve data transmission reliability, a currently known transmission scheme (transmission scheme) uses a plurality of precoding vectors to perform precoder cycling on data to obtain a diversity gain. However, in current technologies, no solution can be used to perform channel measurement and CSI feedback for this transmission scheme.

SUMMARY

This application provides a data transmission method and apparatus, and a system, to perform channel measurement and feedback based on different transmission schemes, so that a diversity gain can be obtained to a greater extent, and data transmission reliability can be improved.

According to a first aspect, a data transmission method is provided, where the method is applied to a communications system including a network device and a terminal device, the network device and the terminal device pre-store a plurality of precoding matrices, and the method includes:

receiving, by the terminal device, at least one reference signal used for channel measurement; and sending, by the terminal device, a plurality of pieces of first indication information based on the at least one reference signal and a transmission scheme on which channel state information CSI feedback is based, where the plurality of pieces of first indication information are used to indicate x target precoding matrices, at least one of the plurality of pieces of first indication information is used to indicate one target precoding matrix, and the x target precoding matrices are determined based on the plurality of precoding matrices, where x is a quantity of target precoding matrices that need to be fed back, and x is an integer greater than 1.

Therefore, according to this embodiment of this application, the terminal device performs channel measurement based on the transmission scheme, and feeds back indication information for determining a plurality of precoding matrices, so that the network device can determine, based on the feedback, the plurality of precoding matrices used for precoder cycling, to meet a requirement of the transmission scheme. Compared with the prior art, a plurality of precoding matrices that are obtained through measurement can be provided for precoder cycling. In this way, a higher diversity gain can be obtained, thereby helping improve data transmission reliability, and helping improve robustness of the communications system.

The transmission scheme on which CSI feedback is based includes: precoder cycling, precoder cycling (precoder cycling)-based space-time transmit diversity (space-time transmit diversity, STTD) (or referred to as space time block coding (space time block coding, STBC)), precoder cycling-based space-frequency transmit diversity (space-frequency transmit diversity, SFTD) (or referred to as space frequency block coding (space frequency block coding, SFBC)), precoder cycling-based cyclic delay diversity (cyclic delay diversity, CDD), or another precoder cycling-based transmission scheme.

In this embodiment of this application, the reference signal may be a precoded reference signal or a non-precoded reference signal.

With reference to the first aspect, in some implementations of the first aspect, each of the at least one reference signal is a reference signal that has undergone precoder cycling, each of the plurality of pieces of first indication information is used to indicate a precoding matrix that corresponds to one of the at least one reference signal and that is at a precoder cycling granularity, a quantity of precoder cycling times is greater than or equal to 1, a quantity of precoding matrices used for precoder cycling is y, and y is an integer greater than 1.

Optionally, when y=x, each of the y precoding matrices used for precoder cycling is used to determine one of the x target precoding matrices, and the y precoding matrices are in a one-to-one correspondence with the x target precoding matrices.

Optionally, when y>x, the method further includes:

sending, by the terminal device, second indication information, where the second indication information indicates x precoding matrices in the y precoding matrices used for precoder cycling, each of the x precoding matrices used for precoder cycling is used to determine one of the x target precoding matrices, and the x precoding matrices used for precoder cycling are in a one-to-one correspondence with the x target precoding matrices.

For ease of understanding, description is provided herein by using one precoder cycling granularity as an example, and a quantity of columns of a precoding matrix used for precoder cycling corresponds to a quantity of reference signals carried by the precoder cycling granularity, that is, corresponds to a quantity of ports. The terminal device may select, through measurement, a precoding vector of an optimal port in a metric criterion as a column vector in a target precoding matrix. In this case, each piece of first indication information is used to indicate one precoding column vector, and a plurality of precoding column vectors indicated by the plurality of pieces of first indication information may be combined to obtain one target precoding matrix. Alternatively, precoding vectors of a plurality of ports may be selected through measurement, and linear superposition is performed to obtain a column vector in a target precoding matrix. In this case, a plurality of pieces of first indication information are used to indicate one precoding column vector, and a plurality of precoding column vectors indicated by the plurality of pieces of first indication information may be combined to obtain one target precoding matrix.

It should be understood that, port selection is merely a possible implementation, and the terminal device may directly feed back a precoding matrix used for precoder cycling to the network device, without performing port selection.

With reference to the first aspect, in some implementations of the first aspect, each of the at least one reference signal is a non-precoded reference signal, each of the plurality of pieces of first indication information includes three codebook indices, the three codebook indices in each piece of first indication information are used to jointly indicate one precoding matrix, and the plurality of pieces of first indication information are in a one-to-one correspondence with the x target precoding matrices.

Optionally, the first indication information is a precoding matrix indicator (precoding matrix indicator, PMI), and the three codebook indices are $i_{1,1}$, $i_{1,2}$, and $i_2$.

With reference to the first aspect, in some implementations of the first aspect, the method further includes:
sending, by the terminal device, indication information of the precoder cycling granularity.

Therefore, the network device performs precoder cycling based on an optimal precoder cycling granularity, thereby further helping obtain the diversity gain, and further improving data transmission reliability.

With reference to the first aspect, in some implementations of the first aspect, the method further includes:
receiving, by the terminal device, at least one candidate value of the precoder cycling granularity.

The network device may send the candidate value of the precoder cycling granularity to the terminal device in advance, and the terminal device may perform measurement separately based on the at least one candidate value, to determine an optimal precoder cycling granularity in a metric criterion and feed back the optimal precoder cycling granularity to the network device, so that measurement complexity of the terminal device can be reduced.

In this embodiment of this application, the quantity x of the target precoding matrices that need to be fed back may be pre-defined (for example, defined by a protocol). Optionally, the quantity x of the target precoding matrices that need to be fed back may be pre-configured in the network device and the terminal device.

The quantity x of the target precoding matrices that need to be fed back may alternatively be determined by the network device, and notified to the terminal device by using signaling. Optionally, the method further includes: receiving, by the terminal device, fifth indication information, where the fifth indication information indicates the quantity x of the target precoding matrices that need to be fed back.

According to a second aspect, a data transmission method is provided, where the method is applied to a communications system including a network device and a terminal device, the network device and the terminal device pre-store a plurality of precoding matrix sets, each of the plurality of precoding matrix sets includes at least one precoding matrix, and the method includes:
receiving, by the terminal device, a plurality of reference signals used for channel measurement; and
sending, by the terminal device, third indication information and fourth indication information based on the plurality of reference signals and a transmission scheme on which CSI feedback is based, where the third indication information is used to indicate a first precoding matrix set in the plurality of precoding matrix sets, and the fourth indication information is used to indicate x target precoding matrices in the first precoding matrix set, where
x is a quantity of target precoding matrices that need to be fed back, and x is an integer greater than 1.

Therefore, according to this embodiment of this application, the terminal device performs channel measurement based on the transmission scheme, and feeds back indication information for determining a plurality of precoding matrices, so that the network device can determine, based on the feedback, the plurality of precoding matrices used for precoder cycling, to meet a requirement of the transmission scheme. Compared with the prior art, a plurality of precoding matrices that are obtained through measurement can be provided for precoder cycling. In this way, a higher diversity gain can be obtained, thereby helping improve data transmission reliability, and helping improve robustness of the communications system.

The transmission scheme on which CSI feedback is based includes: precoder cycling, precoder cycling-based space-time transmit diversity, precoder cycling-based space-frequency transmit diversity, precoder cycling-based cyclic delay diversity, or another precoder cycling-based transmission scheme.

With reference to the second aspect, in some implementations of the second aspect, each of the plurality of reference signals is a non-precoded reference signal, the third indication information includes two codebook indices, and the two codebook indices in the third indication information are used to jointly indicate the first precoding matrix set.

Optionally, the third indication information may be two codebook indices $i_{1,1}$ and $i_{1,2}$ in a PMI; and in a Long Term Evolution (Long Term Evolution, LTE) protocol, $i_{1,1}$ and $i_{1,2}$ may be used to jointly indicate one precoding matrix set.

With reference to the second aspect, in some implementations of the second aspect, the method further includes:
sending, by the terminal device, indication information of a precoder cycling granularity.

Therefore, the network device can perform precoder cycling based on an optimal precoder cycling granularity, thereby further helping obtain the diversity gain, and further improving data transmission reliability.

With reference to the second aspect, in some implementations of the second aspect, the method further includes:
receiving, by the terminal device, at least one candidate value of the precoder cycling granularity.

The network device may send the candidate value of the precoder cycling granularity to the terminal device in advance, and the terminal device may perform measurement separately based on the at least one candidate value, to determine an optimal precoder cycling granularity in a metric criterion and feed back the optimal precoder cycling granularity to the network device, so that measurement complexity of the terminal device can be reduced.

In this embodiment of this application, the quantity x of the target precoding matrices that need to be fed back may be pre-defined (for example, defined by a protocol). Optionally, the quantity x of the target precoding matrices that need to be fed back may be pre-configured in the network device and the terminal device.

The quantity x of the target precoding matrices that need to be fed back may alternatively be determined by the network device, and notified to the terminal device by using signaling. Optionally, the method further includes: receiving, by the terminal device, fifth indication information, where the fifth indication information indicates the quantity x of the target precoding matrices that need to be fed back.

According to a third aspect, a data transmission method is provided, where the method is applied to a communications system including a network device and a terminal device, the network device and the terminal device pre-store a plurality of precoding matrices, and the method includes:

sending, by the network device, at least one reference signal used for channel measurement;

receiving, by the network device, a plurality of pieces of first indication information that are fed back by the terminal device based on the at least one reference signal and a transmission scheme on which CSI feedback is based, where the plurality of pieces of first indication information are used to indicate x target precoding matrices, at least one of the plurality of pieces of first indication information is used to indicate one target precoding matrix, and the x target precoding matrices are determined based on the plurality of precoding matrices; and determining, by the network device, the x target precoding matrices based on the plurality of pieces of first indication information, where x is a quantity of target precoding matrices that need to be fed back, and x is an integer greater than 1.

Therefore, according to this embodiment of this application, the terminal device performs channel measurement based on the transmission scheme, and feeds back indication information for determining a plurality of precoding matrices, so that the network device can determine, based on the feedback, the plurality of precoding matrices used for precoder cycling, to meet a requirement of the transmission scheme. Compared with the prior art, a plurality of precoding matrices that are obtained through measurement can be provided for precoder cycling. In this way, a higher diversity gain can be obtained, thereby helping improve data transmission reliability, and helping improve robustness of the communications system.

The transmission scheme on which CSI feedback is based includes: precoder cycling, precoder cycling-based space-time transmit diversity, precoder cycling-based space-frequency transmit diversity, precoder cycling-based cyclic delay diversity, or another precoder cycling-based transmission scheme.

In this embodiment of this application, the reference signal may be a precoded reference signal or a non-precoded reference signal.

With reference to the third aspect, in some implementations of the third aspect, each of the at least one reference signal is a reference signal that has undergone precoder cycling, each of the plurality of pieces of first indication information is used to indicate a precoding matrix that corresponds to one of the at least one reference signal and that is at a precoder cycling granularity, a quantity of precoder cycling times is greater than or equal to 1, a quantity of precoding matrices used for precoder cycling is y, and y is an integer greater than 1.

Optionally, when y=x, the determining, by the network device, the x target precoding matrices based on the plurality of pieces of first indication information includes:

determining, by the network device, all of the x target precoding matrices based on the plurality of pieces of first indication information and all of the y precoding matrices used for precoder cycling, where the y precoding matrices used for precoder cycling are in a one-to-one correspondence with the x target precoding matrices.

Optionally, when y>x, the determining, by the network device, the x target precoding matrices based on the plurality of pieces of first indication information includes:

receiving, by the network device, second indication information, and determining, based on the second indication information, x precoding matrices from the y precoding matrices used for precoder cycling; and determining, by the network device, all of the x target precoding matrices based on the plurality of pieces of first indication information and all of the x precoding matrices used for precoder cycling, where the x precoding matrices used for precoder cycling are in a one-to-one correspondence with the x target precoding matrices.

For ease of understanding, description is provided herein by using one precoder cycling granularity as an example, and a quantity of columns of a precoding matrix used for precoder cycling corresponds to a quantity of reference signals carried by the precoder cycling granularity, that is, corresponds to a quantity of ports. The terminal device may select, through measurement, a precoding vector of an optimal port in a metric criterion as a column vector in a target precoding matrix. In this case, each piece of first indication information is used to indicate one precoding column vector, and a plurality of precoding column vectors indicated by the plurality of pieces of first indication information may be combined to obtain one target precoding matrix. Alternatively, precoding vectors of a plurality of ports may be selected through measurement, and linear superposition is performed to obtain a column vector in a target precoding matrix. In this case, a plurality of pieces of first indication information are used to indicate one precoding column vector, and a plurality of precoding column vectors indicated by the plurality of pieces of first indication information may be combined to obtain one target precoding matrix.

With reference to the third aspect, in some implementations of the third aspect, each of the at least one reference signal is a non-precoded reference signal, each of the plurality of pieces of first indication information includes three codebook indices, the three codebook indices in each piece of first indication information are used to jointly indicate one precoding matrix, and the plurality of pieces of first indication information are in a one-to-one correspondence with the x target precoding matrices.

Optionally, the first indication information is a precoding matrix indicator (precoding matrix indicator, PMI), and the three codebook indices are $i_{1,1}$, $i_{1,2}$, and $i_2$.

With reference to the third aspect, in some implementations of the third aspect, the method further includes:

receiving, by the network device, indication information of the precoder cycling granularity.

Therefore, the network device can perform precoder cycling based on an optimal precoder cycling granularity, thereby further helping obtain the diversity gain, and further improving data transmission reliability.

With reference to the third aspect, in some implementations of the third aspect, the method further includes:

sending, by the network device, at least one candidate value of the precoder cycling granularity.

The network device may send the candidate value of the precoder cycling granularity to the terminal device in advance, and the terminal device may perform measurement separately based on the at least one candidate value, to determine an optimal precoder cycling granularity in a metric criterion and feed back the optimal precoder cycling granularity to the network device, so that measurement complexity of the terminal device can be reduced.

In this embodiment of this application, the quantity x of the target precoding matrices that need to be fed back may be pre-defined (for example, defined by a protocol). Optionally, the quantity x of the target precoding matrices that need to be fed back may be pre-configured in the network device and the terminal device.

The quantity x of the target precoding matrices that need to be fed back may alternatively be determined by the network device, and notified to the terminal device by using signaling. Optionally, the method further includes: sending, by the network device, fifth indication information, where the fifth indication information indicates the quantity x of the target precoding matrices that need to be fed back.

According to a fourth aspect, a data transmission method is provided, where the method is applied to a communications system including a network device and a terminal device, the network device and the terminal device pre-store a plurality of precoding matrix sets, each of the plurality of precoding matrix sets includes at least one precoding matrix, and the method includes:

sending, by the network device, a plurality of reference signals used for channel measurement;

receiving, by the network device, third indication information and fourth indication information that are fed back by the terminal device based on the plurality of reference signals and a transmission scheme on which CSI feedback is based, where the third indication information is used to indicate a first precoding matrix set in the plurality of precoding matrix sets, and the fourth indication information is used to indicate x target precoding matrices in the first precoding matrix set; and determining, by the network device, the x target precoding matrices based on the third indication information and the fourth indication information, where x is a quantity of target precoding matrices that need to be fed back, and x is an integer greater than 1.

Therefore, according to this embodiment of this application, the terminal device performs channel measurement based on the transmission scheme, and feeds back indication information for determining a plurality of precoding matrices, so that the network device can determine, based on the feedback, the plurality of precoding matrices used for precoder cycling, to meet a requirement of the transmission scheme. Compared with the prior art, a plurality of precoding matrices that are obtained through measurement can be provided for precoder cycling. In this way, a higher diversity gain can be obtained, thereby helping improve data transmission reliability, and helping improve robustness of the communications system.

The transmission scheme on which CSI feedback is based includes: precoder cycling, precoder cycling-based space-time transmit diversity, precoder cycling-based space-frequency transmit diversity, precoder cycling-based cyclic delay diversity, or another precoder cycling-based transmission scheme.

With reference to the fourth aspect, in some implementations of the fourth aspect, each of the plurality of reference signals is a non-precoded reference signal, the third indication information includes two codebook indices, and the two codebook indices in the third indication information are used to jointly indicate the first precoding matrix set.

Optionally, the third indication information may be two codebook indices $i_{1,1}$ and $i_{1,2}$ in a PMI; and in an LTE protocol, $i_{1,1}$ and $i_{1,2}$ may be used to jointly indicate one precoding matrix set.

With reference to the fourth aspect, in some implementations of the fourth aspect, the method further includes:

receiving, by the network device, indication information of a precoder cycling granularity.

Therefore, the network device can perform precoder cycling based on an optimal precoder cycling granularity, thereby further helping obtain the diversity gain, and further improving data transmission reliability.

With reference to the fourth aspect, in some implementations of the fourth aspect, the method further includes:

sending, by the network device, at least one candidate value of the precoder cycling granularity.

The network device may send the candidate value of the precoder cycling granularity to the terminal device in advance, and the terminal device may perform measurement separately based on the at least one candidate value, to determine an optimal precoder cycling granularity in a metric criterion and feed back the optimal precoder cycling granularity to the network device, so that measurement complexity of the terminal device can be reduced.

In this embodiment of this application, the quantity x of the target precoding matrices that need to be fed back may be pre-defined (for example, defined by a protocol). Optionally, the quantity x of the target precoding matrices that need to be fed back may be pre-configured in the network device and the terminal device.

The quantity x of the target precoding matrices that need to be fed back may alternatively be determined by the network device, and notified to the terminal device by using signaling. Optionally, the method further includes: sending, by the network device, fifth indication information, where the fifth indication information indicates the quantity x of the target precoding matrices that need to be fed back.

According to a fifth aspect, a data transmission method is provided, where the method is applied to a communications system including a network device and a terminal device, the network device and the terminal device pre-store a plurality of precoding matrices, and the method includes:

receiving, by the network device, at least one reference signal used for channel measurement; and sending, by the network device, a plurality of pieces of sixth indication information based on the at least one reference signal and a transmission scheme on which CSI measurement is based, where the plurality of pieces of sixth indication information are used to indicate x target precoding matrices, at least one of the plurality of pieces of sixth indication information is used to indicate one target precoding matrix, and the x target precoding matrices are determined based on the plurality of precoding matrices, where x is a quantity of target precoding matrices that need to be indicated, and x is an integer greater than 1.

Therefore, according to this embodiment of this application, the network device performs channel measurement based on the transmission scheme, and sends indication information for determining a plurality of precoding matrices, so that the terminal device can determine, based on the indication information, a plurality of precoding matrices used for precoder cycling, to meet a requirement of the transmission scheme. Compared with the prior art, a plurality of precoding matrices that are obtained through measurement can be provided for precoder cycling. In this way, a higher diversity gain can be obtained, thereby helping improve data transmission reliability, and helping improve robustness of the communications system.

The transmission scheme on which CSI measurement is based includes: precoder cycling, precoder cycling-based space-time transmit diversity, precoder cycling-based space-frequency transmit diversity, precoder cycling-based cyclic delay diversity, or another precoder cycling-based transmission scheme.

In this embodiment of this application, the reference signal may be a precoded reference signal or a non-precoded reference signal.

With reference to the fifth aspect, in some implementations of the fifth aspect, each of the at least one reference signal is a reference signal that has undergone precoder cycling, each of the plurality of pieces of sixth indication information is used to indicate a precoding matrix that corresponds to one of the at least one reference signal and that is at a precoder cycling granularity, a quantity of precoder cycling times is greater than or equal to 1, a quantity of precoding matrices used for precoder cycling is y, and y is an integer greater than 1.

Optionally, when y=x, each of the y precoding matrices used for precoder cycling is used to determine one of the x target precoding matrices, and the y precoding matrices are in a one-to-one correspondence with the x target precoding matrices.

Optionally, when y>x, the method further includes:

sending, by the network device, seventh indication information, where the seventh indication information is used to indicate x precoding matrices in the y precoding matrices used for precoder cycling, each of the x precoding matrices used for precoder cycling is used to determine one of the x target precoding matrices, and the x precoding matrices used for precoder cycling are in a one-to-one correspondence with the x target precoding matrices.

For ease of understanding, description is provided herein by using one precoder cycling granularity as an example, and a quantity of columns of a precoding matrix used for precoder cycling corresponds to a quantity of reference signals carried by the precoder cycling granularity, that is, corresponds to a quantity of ports. The network device may select, through measurement, a precoding vector of an optimal port in a metric criterion as a column vector in a target precoding matrix. In this case, each piece of sixth indication information is used to indicate one precoding column vector, and a plurality of precoding column vectors indicated by the plurality of pieces of sixth indication information may be combined, to obtain a target precoding matrix. Alternatively, precoding vectors of a plurality of ports may be selected through measurement, and linear superposition is performed to obtain a column vector in a target precoding matrix. In this case, a plurality of pieces of sixth indication information are used to indicate one precoding column vector, and a plurality of precoding column vectors indicated by the plurality of pieces of sixth indication information may be combined, to obtain a target precoding matrix.

It should be understood that, port selection is merely a possible implementation, and the network device may directly indicate a precoding matrix used for precoder cycling to the terminal device, without performing port selection.

With reference to the fifth aspect, in some implementations of the fifth aspect, each of the at least one reference signal is a non-precoded reference signal, each of the plurality of pieces of sixth indication information includes three codebook indices, the three codebook indices in each piece of sixth indication information are used to jointly indicate one precoding matrix, and the plurality of pieces of sixth indication information are in a one-to-one correspondence with the x target precoding matrices.

Optionally, the sixth indication information is a PMI, and the three codebook indices are $i_{1,1}$, $i_{1,2}$, and $i_2$.

With reference to the fifth aspect, in some implementations of the fifth aspect, the method further includes:

sending, by the network device, indication information of the precoder cycling granularity.

Therefore, the terminal device performs precoder cycling based on an optimal precoder cycling granularity, thereby further helping obtain the diversity gain, and further improving data transmission reliability.

In this embodiment of this application, the quantity x of the target precoding matrices that need to be indicated may be pre-defined (for example, defined by a protocol), or may be determined by the network device. This is not limited in this application.

According to a sixth aspect, a data transmission method is provided, where the method is applied to a communications system including a network device and a terminal device, the network device and the terminal device pre-store a plurality of precoding matrix sets, each of the plurality of precoding matrix sets includes at least one precoding matrix, and the method includes:

receiving, by the network device, a plurality of reference signals used for channel measurement; and sending, by the network device, eighth indication information and ninth indication information based on the plurality of reference signals and a transmission scheme on which CSI measurement is based, where the eighth indication information is used to indicate a first precoding matrix set in the plurality of precoding matrix sets, and the ninth indication information is used to indicate x target precoding matrices in the first precoding matrix set, where x is a quantity of target precoding matrices that need to be indicated, and x is an integer greater than 1.

Therefore, according to this embodiment of this application, the network device performs channel measurement based on the transmission scheme, and sends indication information for determining a plurality of precoding matrices, so that the terminal device can determine, based on the indication information, a plurality of precoding matrices used for precoder cycling, to meet a requirement of the transmission scheme. Compared with the prior art, a plurality of precoding matrices that are obtained through measurement can be provided for precoder cycling. In this way, a higher diversity gain can be obtained, thereby helping improve data transmission reliability, and helping improve robustness of the communications system.

The transmission scheme on which CSI measurement is based includes: precoder cycling, precoder cycling-based space-time transmit diversity, precoder cycling-based space-frequency transmit diversity, precoder cycling-based cyclic delay diversity, or another precoder cycling-based transmission scheme.

With reference to the sixth aspect, in some implementations of the sixth aspect, each of the plurality of reference signals is a non-precoded reference signal, the eighth indication information includes two codebook indices, and the two codebook indices in the eighth indication information are used to jointly indicate the first precoding matrix set.

Optionally, the eighth indication information may be two codebook indices $i_{1,1}$ and $i_{1,2}$ in a PMI; and in an LTE protocol, $i_{1,1}$ and $i_{1,2}$ may be used to jointly indicate one precoding matrix set.

With reference to the sixth aspect, in some implementations of the sixth aspect, the method further includes:

sending, by the network device, indication information of a precoder cycling granularity.

Therefore, the terminal device can perform precoder cycling based on an optimal precoder cycling granularity, thereby further helping obtain the diversity gain, and further improving data transmission reliability.

In this embodiment of this application, the quantity x of the target precoding matrices that need to be indicated may be pre-defined (for example, defined by a protocol), or may be determined by the network device. This is not limited in this application.

According to a seventh aspect, a data transmission method is provided, where the method is applied to a communications system including a network device and a terminal device, the network device and the terminal device pre-store a plurality of precoding matrices, and the method includes:

sending, by the terminal device, at least one reference signal used for channel measurement;

receiving, by the terminal device, a plurality of pieces of sixth indication information that are sent by the network device based on the at least one reference signal and a transmission scheme on which CSI measurement is based, where the plurality of pieces of sixth indication information are used to indicate x target precoding matrices, at least one of the plurality of pieces of sixth indication information is used to indicate one target precoding matrix, and the x target precoding matrices are determined based on the plurality of precoding matrices; and determining, by the terminal device, the x target precoding matrices based on the plurality of pieces of sixth indication information, where x is a quantity of target precoding matrices that need to be indicated, and x is an integer greater than 1.

Therefore, according to this embodiment of this application, the network device performs channel measurement based on the transmission scheme, and sends indication information for determining a plurality of precoding matrices, so that the terminal device can determine, based on the indication information, a plurality of precoding matrices used for precoder cycling, to meet a requirement of the transmission scheme. Compared with the prior art, a plurality of precoding matrices that are obtained through measurement can be provided for precoder cycling. In this way, a higher diversity gain can be obtained, thereby helping improve data transmission reliability, and helping improve robustness of the communications system.

The transmission scheme on which CSI measurement is based includes: precoder cycling, precoder cycling-based space-time transmit diversity, precoder cycling-based space-frequency transmit diversity, precoder cycling-based cyclic delay diversity, or another precoder cycling-based transmission scheme.

In this embodiment of this application, the reference signal may be a precoded reference signal or a non-precoded reference signal.

With reference to the seventh aspect, in some implementations of the seventh aspect, each of the at least one reference signal is a reference signal that has undergone precoder cycling, each of the plurality of pieces of sixth indication information is used to indicate a precoding matrix that corresponds to one of the at least one reference signal and that is at a precoder cycling granularity, a quantity of precoder cycling times is greater than or equal to 1, a quantity of precoding matrices used for precoder cycling is y, and y is an integer greater than 1.

Optionally, when y=x, each of the y precoding matrices used for precoder cycling is used to determine one of the x target precoding matrices, and the y precoding matrices are in a one-to-one correspondence with the x target precoding matrices.

Optionally, when y>x, the determining, by the terminal device, the x target precoding matrices based on the plurality of pieces of sixth indication information includes:

receiving, by the terminal device, seventh indication information, and determining, based on the seventh indication information, x precoding matrices from the y precoding matrices used for precoder cycling; and determining, by the terminal device, all of the x target precoding matrices based on the plurality of pieces of sixth indication information and all of the x precoding matrices used for precoder cycling, where the x precoding matrices used for precoder cycling are in a one-to-one correspondence with the x target precoding matrices.

For ease of understanding, description is provided herein by using one precoder cycling granularity as an example, and a quantity of columns of a precoding matrix used for precoder cycling corresponds to a quantity of reference signals carried by the precoder cycling granularity, that is, corresponds to a quantity of ports. The network device may select, through measurement, a precoding vector of an optimal port in a metric criterion as a column vector in a target precoding matrix. In this case, each piece of sixth indication information is used to indicate one precoding column vector, and a plurality of precoding column vectors indicated by the plurality of pieces of sixth indication information may be combined, to obtain a target precoding matrix. Alternatively, precoding vectors of a plurality of ports may be selected through measurement, and linear superposition is performed to obtain a column vector in a target precoding matrix. In this case, a plurality of pieces of sixth indication information are used to indicate one precoding column vector, and a plurality of precoding column vectors indicated by the plurality of pieces of sixth indication information may be combined, to obtain a target precoding matrix.

It should be understood that, port selection is merely a possible implementation, and the network device may directly indicate a precoding matrix used for precoder cycling to the terminal device, without performing port selection.

With reference to the seventh aspect, in some implementations of the seventh aspect, each of the at least one reference signal is a non-precoded reference signal, each of the plurality of pieces of sixth indication information includes three codebook indices, the three codebook indices in each piece of sixth indication information are used to jointly indicate one precoding matrix, and the plurality of pieces of sixth indication information are in a one-to-one correspondence with the x target precoding matrices.

Optionally, the sixth indication information is a PMI, and the three codebook indices are $i_{1,1}$, $i_{1,2}$, and $i_2$.

With reference to the seventh aspect, in some implementations of the seventh aspect, the method further includes:

receiving, by the terminal device, indication information of precoder cycling.

Therefore, the terminal device performs precoder cycling based on an optimal precoder cycling granularity, thereby further helping obtain the diversity gain, and further improving data transmission reliability.

In this embodiment of this application, the quantity x of the target precoding matrices that need to be indicated may be pre-defined (for example, defined by a protocol), or may be determined by the network device. This is not limited in this application.

According to an eighth aspect, a data transmission method is provided, where the method is applied to a communications system including a network device and a terminal device, the network device and the terminal device pre-store a plurality of precoding matrix sets, each of the plurality of precoding matrix sets includes at least one precoding matrix, and the method includes:

sending, by the terminal device, a plurality of reference signals used for channel measurement;

receiving, by the terminal device, eighth indication information and ninth indication information that are sent by the network device based on the plurality of reference signals and a transmission scheme on which CSI measurement is based, where the eighth indication information is used to indicate a first precoding matrix set in the plurality of precoding matrix sets, and the ninth indication information is used to indicate x target precoding matrices in the first precoding matrix set; and determining, by the terminal device, the x target precoding matrices based on the eighth indication information and the ninth indication information, where x is a quantity of target precoding matrices that need to be indicated, and x is an integer greater than 1.

Therefore, according to this embodiment of this application, the network device performs channel measurement based on the transmission scheme, and sends indication information for determining a plurality of precoding matrices, so that the terminal device can determine, based on the indication information, a plurality of precoding matrices used for precoder cycling, to meet a requirement of the transmission scheme. Compared with the prior art, a plurality of precoding matrices that are obtained through measurement can be provided for precoder cycling. In this way, a higher diversity gain can be obtained, thereby helping improve data transmission reliability, and helping improve robustness of the communications system.

The transmission scheme on which CSI measurement is based includes: precoder cycling, precoder cycling-based space-time transmit diversity, precoder cycling-based space-frequency transmit diversity, precoder cycling-based cyclic delay diversity, or another precoder cycling-based transmission scheme.

With reference to the eighth aspect, in some implementations of the eighth aspect, each of the plurality of reference signals is a non-precoded reference signal, the eighth indication information includes two codebook indices, and the two codebook indices in the eighth indication information are used to jointly indicate the first precoding matrix set.

Optionally, the eighth indication information may be two codebook indices $i_{1,1}$ and $i_{1,2}$ in a PMI; and in an LTE protocol, $i_{1,1}$ and $i_{1,2}$ may be used to jointly indicate one precoding matrix set.

With reference to the eighth aspect, in some implementations of the eighth aspect, the method further includes:

receiving, by the terminal device, indication information of a precoder cycling granularity.

Therefore, the terminal device can perform precoder cycling based on an optimal precoder cycling granularity, thereby further helping obtain the diversity gain, and further improving data transmission reliability.

According to a ninth aspect, a channel measurement indication method is provided, including:

receiving, by a terminal device, tenth indication information, where the tenth indication information indicates a frequency band granularity on which channel measurement is based, and a frequency band corresponding to one frequency band granularity corresponds to one precoding matrix; and determining, by the terminal device, the frequency band granularity based on the tenth indication information.

In this embodiment of this application, measurement bandwidth includes at least one frequency band granularity. The measurement bandwidth may be bandwidth for transmitting a channel measurement reference signal, or may be bandwidth that is used for feeding back CSI after measurement. In other words, the measurement bandwidth may be all or a part of the bandwidth for transmitting the channel measurement reference signal.

Therefore, the terminal device performs channel measurement based on the frequency band granularity, so that when channel measurement is inaccurate, an equivalent channel on which precoding is performed by using a plurality of precoding matrices on the measurement bandwidth is measured, to obtain relatively accurate CSI, thereby helping improve data transmission reliability, and improving robustness of the system.

With reference to the ninth aspect, in some implementations of the ninth aspect, the method further includes: performing, by the terminal device, channel measurement on measurement bandwidth based on the frequency band granularity, where the measurement bandwidth is bandwidth for feeding back channel state information CSI.

In other words, the terminal device may perform channel measurement based on the frequency band granularity indicated by the network device, and perform CSI feedback based on a result obtained through measurement on the entire measurement bandwidth.

With reference to the ninth aspect, in some implementations of the ninth aspect, the bandwidth for feeding back CSI is all or a part of bandwidth for transmitting a reference signal.

With reference to the ninth aspect, in some implementations of the ninth aspect, the frequency band granularity is a bandwidth size of a precoding resource block group PRG.

With reference to the ninth aspect, in some implementations of the ninth aspect, the precoding matrix is randomly selected by the terminal device from a pre-defined codebook.

With reference to the ninth aspect, in some implementations of the ninth aspect, the performing, by the terminal device, channel measurement on measurement bandwidth based on the frequency band granularity includes:

using, by the terminal device, the frequency band granularity as a precoder cycling granularity, and performing channel measurement on the measurement bandwidth based on a transmission scheme of precoder cycling.

With reference to the ninth aspect, in some implementations of the ninth aspect, the tenth indication information is carried in any one of the following signaling: a radio resource control RRC message, a Media Access Control MAC-control element CE, or downlink control information DCI.

With reference to the ninth aspect, in some implementations of the ninth aspect, precoding matrices corresponding to any two adjacent frequency bands having a same frequency band granularity are different.

According to a tenth aspect, a data transmission method is provided, including:

determining, by a network device, a frequency band granularity on which channel measurement is based, where a frequency band corresponding to one frequency band granularity corresponds to one precoding matrix; and sending, by the network device, tenth indication information, where the tenth indication information indicates the frequency band granularity.

In this embodiment of this application, measurement bandwidth includes at least one frequency band granularity. The measurement bandwidth may be bandwidth for transmitting a channel measurement reference signal, or may be bandwidth that is used for feeding back CSI after measurement. In other words, the measurement bandwidth may be all or a part of the bandwidth for transmitting the channel measurement reference signal.

Therefore, the terminal device performs channel measurement based on the frequency band granularity, so that when channel measurement is inaccurate, an equivalent channel on which precoding is performed by using a plurality of precoding matrices on the measurement bandwidth is measured, to obtain relatively accurate CSI, thereby helping improve data transmission reliability, and improving robustness of the system.

With reference to the tenth aspect, in some implementations of the tenth aspect, the frequency band granularity is a bandwidth size of a precoding resource block group PRG With reference to the tenth aspect, in some implementations of the tenth aspect, the tenth indication information is carried in any one of the following signaling: a radio resource control RRC message, a Media Access Control MAC-control element CE, or downlink control information DCI.

With reference to the tenth aspect, in some implementations of the tenth aspect, precoding matrices corresponding to any two adjacent frequency bands having a same frequency band granularity are different.

According to an eleventh aspect, a terminal device is provided, where the terminal device includes modules for performing the data transmission method in any one of the first aspect or possible implementations of the first aspect, or modules for performing the data transmission method in any one of the second aspect or possible implementations of the second aspect, or modules for performing the data transmission method in any one of the seventh aspect or possible implementations of the seventh aspect, or modules for performing the data transmission method in any one of the eighth aspect or possible implementations of the eighth aspect, or modules for performing the data transmission method in any one of the ninth aspect or possible implementations of the ninth aspect.

According to a twelfth aspect, a network device is provided, where the network device includes modules for performing the data transmission method in any one of the third aspect or possible implementations of the third aspect, or modules for performing the data transmission method in any one of the fourth aspect or possible implementations of the fourth aspect, or modules for performing the data transmission method in any one of the fifth aspect or possible implementations of the fifth aspect, or modules for performing the data transmission method in any one of the sixth aspect or possible implementations of the sixth aspect, or modules for performing the data transmission method in any one of the tenth aspect or possible implementations of the tenth aspect.

According to a thirteenth aspect, a terminal device is provided, including a transceiver, a processor, and a memory. The processor is configured to control the transceiver to receive and send a signal. The memory is configured to store a computer program. The processor is configured to invoke the computer program from the memory and run the computer program, so that the terminal device performs the method in any one of the first aspect or possible implementations of the first aspect, or the method in any one of the second aspect or possible implementations of the second aspect, or the method in any one of the seventh aspect or possible implementations of the seventh aspect, or the method in any one of the eighth aspect or possible implementations of the eighth aspect, or modules for performing the data transmission method in any one of the ninth aspect or possible implementations of the ninth aspect.

According to a fourteenth aspect, a network device is provided, including a transceiver, a processor, and a memory. The processor is configured to control the transceiver to receive and send a signal. The memory is configured to store a computer program. The processor is configured to invoke the computer program from the memory and run the computer program, so that the network device performs the method in any one of the third aspect or possible implementations of the third aspect, or the method in any one of the fourth aspect or possible implementations of the fourth aspect, or the method in any one of the fifth aspect or possible implementations of the fifth aspect, or the method in any one of the sixth aspect or possible implementations of the sixth aspect, or modules for performing the data transmission method in any one of the tenth aspect or possible implementations of the tenth aspect.

In a specific implementation process, the processor in the thirteenth aspect or the fourteenth aspect may be configured to perform, for example but not limited to, baseband-related processing. A receiver and a transmitter may be separately configured to perform, for example but not limited to, radio frequency sending and receiving. The foregoing devices may be separately disposed on chips that are independent of each other, or at least some or all of the devices are disposed on a same chip. For example, the receiver and the transmitter may be disposed on a receiver chip and a transmitter chip that are independent of each other, or may be integrated into a transceiver so as to be disposed on a transceiver chip. For another example, the processor may be further divided into an analog baseband processor and a digital baseband processor. The analog baseband processor and the transceiver may be integrated in a same chip, and the digital baseband processor may be disposed on an independent chip. As integrated circuit technologies continuously develop, a growing number of devices can be integrated in a same chip. For example, the digital baseband processor and a plurality of types of processors (for example but not limited to, a graphics processing unit and a multi-media processor) may be integrated in a same chip. Such a chip may be referred to as a system on chip (System on Chip). Whether the devices are independently disposed on different chips or integrated in one or more chips usually depends on a specific requirement of a product design. This embodiment of this application imposes no limitation on a specific implementation of the foregoing devices.

According to a fifteenth aspect, a processor is provided, including: an input circuit, an output circuit, and a processing circuit. The processing circuit is configured to receive a signal by using the input circuit, and transmit a signal by using the output circuit, so that the processor performs the method in any one of the first aspect to the tenth aspect and possible implementations of the first aspect to the tenth aspect.

In a specific implementation process, the foregoing processor may be a chip, the input circuit may be an input pin, the output circuit may be an output pin, and the processing circuit may be a transistor, a gate circuit, a trigger, various logic circuits, and the like. The input signal received by the input circuit may be received and input by, for example but not limited to, a receiver, and the signal output by the output circuit may be, for example but not limited to, output to a transmitter and transmitted by the transmitter. Further, the input circuit and the output circuit may be a same circuit, and the circuit is used as the input circuit and the output circuit separately at different moments. This embodiment of this application imposes no limitation on a specific implementation of the processor and various circuits.

According to a sixteenth aspect, a processing apparatus is provided, including a memory and a processor. The processor is configured to read an instruction stored in the memory, receive a signal by using a receiver, and transmit a signal by using a transmitter, to perform the method in any one of the first aspect to the tenth aspect and possible implementations of the first aspect to the tenth aspect.

Optionally, there are one or more processors, and there are one or more memories.

Optionally, the memory and the processor may be integrated, or the memory and the processor may be separately disposed.

In a specific implementation process, the memory may be a non-transitory (non-transitory) memory, for example, a read-only memory (Read Only Memory, ROM). The memory and the processor may be integrated in a same chip, or may be separately disposed on different chips. This embodiment of this application imposes no limitation on a type of the memory and a manner in which the memory and the processor are disposed.

According to a seventeenth aspect, a chip is provided, including a processor and a memory. The memory is configured to store a computer program. The processor is configured to invoke the computer program from the memory and run the computer program, and the computer program is used to implement the method in any one of the first aspect to the tenth aspect and possible implementations of the first aspect to the tenth aspect.

According to an eighteenth aspect, a computer program product is provided, where the computer program product includes a computer program (or may be referred to as code or an instruction). When the computer program runs, a computer is enabled to perform the method in any one of the first aspect to the tenth aspect and possible implementations of the first aspect to the tenth aspect.

According to a nineteenth aspect, a computer readable medium is provided, where the computer readable medium stores a computer program (or may be referred to as code or an instruction). When the computer program runs on a computer, the computer is enabled to perform the method in any one of the first aspect to the tenth aspect and possible implementations of the first aspect to the tenth aspect.

The computer readable storage medium is a non-transitory medium.

Based on the foregoing design, in the embodiments of this application, channel measurement can be performed based on the transmission scheme, and the indication information for determining a plurality of precoding matrices are fed back, to meet a requirement of the transmission scheme of precoder cycling, thereby helping improve data transmission reliability, and improving robustness of the communications system.

DESCRIPTION OF EMBODIMENTS

The following describes the technical solutions in this application with reference to the accompanying drawings.

The technical solutions in the embodiments of this application are applicable to various communications systems, such as a Global System for Mobile Communications (Global System for Mobile Communications, GSM) system, a Code Division Multiple Access (Code Division Multiple Access, CDMA) system, a Wideband Code Division Multiple Access (Wideband Code Division Multiple Access, WCDMA) system, a general packet radio service (general packet radio service, GPRS), a Long Term Evolution (Long Term Evolution, LTE) system, an LTE frequency division duplex (frequency division duplex, FDD) system, an LTE time division duplex (time division duplex, TDD), a Universal Mobile Telecommunications System (Universal Mobile Telecommunication System, UMTS), a Worldwide Interoperability for Microwave Access (Worldwide Interoperability for Microwave Access, WiMAX) communications system, or a future 5G system or new radio (new radio, NR).

Figure 1:
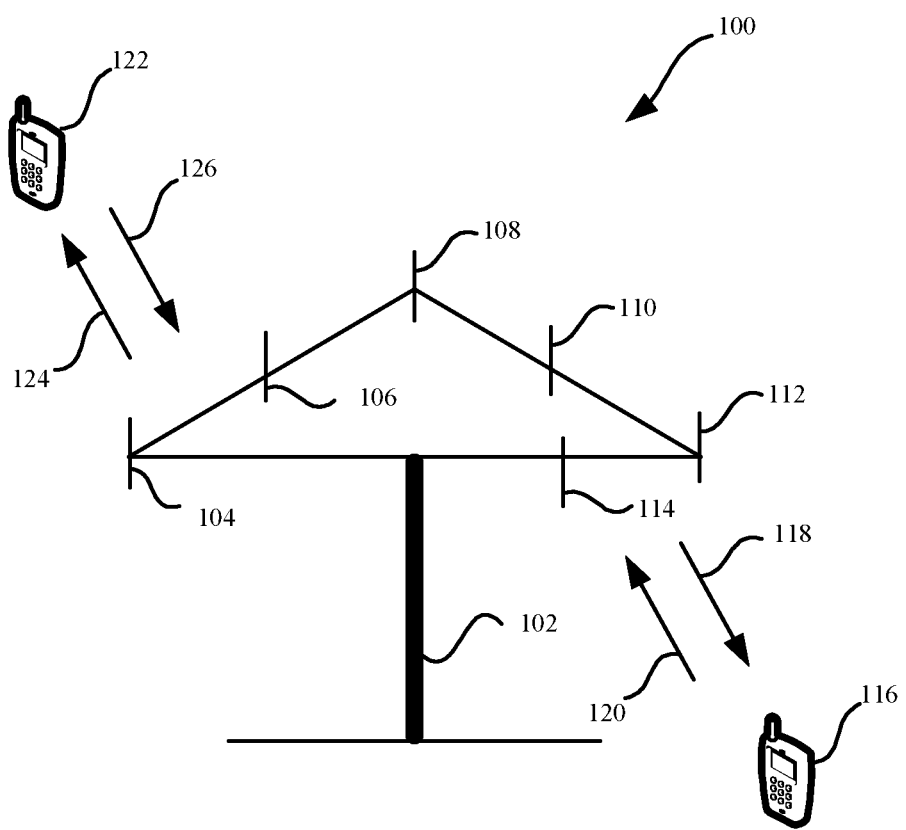
FIG. 1 is a schematic diagram of a communications system applicable to a data transmission method in embodiments of this application.

For ease of understanding of the embodiments of this application, a communications system applicable to the embodiments of this application is first described in detail with reference to FIG. 1. FIG. 1 is a schematic diagram of a communications system applicable to a data transmission method and apparatus in the embodiments of this application. As shown in FIG. 1, the communications system 100 includes a network device 102. The network device 102 may include a plurality of antennas, for example, antennas 104, 106, 108, 110, 112, and 114. In addition, the network device 102 may include a transmitter link and a receiver link. A person of ordinary skill in the art may understand that, both the transmitter link and the receiver link may include a plurality of components (such as a processor, a modulator, a multiplexer, a demodulator, a demultiplexer, or an antenna) related to signal sending and receiving.

It should be understood that, the network device may be any device having a radio transceiver function or a chip that can be disposed in the device. The device includes but is not limited to: a base station (such as a NodeB NodeB, an evolved NodeB eNodeB; a network device (such as a transmission point (transmission point, TP) or a transmission reception point (transmission reception point, TRP), a base station, or a small cell device) in a 5G communications system; a network device in a future communications system; an access point, a radio relay node, a wireless backhaul node in a Wireless Fidelity (Wireless-Fidelity, Wi-Fi) system; and the like.

The network device 102 can communicate with a plurality of terminal devices (such as a terminal device 116 and a terminal device 122). The network device 102 can communicate with any quantity of terminal devices similar to the terminal device 116 or 122.

It should be understood that, the terminal device may also be referred to as user equipment (user equipment, UE), an access terminal, a subscriber unit, a subscriber station, a mobile station, a remote station, a remote terminal, a mobile device, a user terminal, a terminal, a wireless communications device, a user agent, or a user apparatus. The terminal device in the embodiments of this application may be a mobile phone (mobile phone), a tablet computer (Pad), a computer having a radio transceiver function, a virtual reality (Virtual Reality, VR) terminal device, an augmented reality (Augmented Reality, AR) terminal device, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), and the like. The embodiments of this application impose no limitation on an application scenario. In this application, the foregoing terminal devices and a chip that can be disposed in the foregoing terminal devices are collectively referred to as terminal devices.

As shown in FIG. 1, the terminal device 116 communicates with the antennas 112 and 114, where antennas 112 and 114 send information to the terminal device 116 by using a forward link 118, and receive information from the terminal device 116 by using a reverse link 120. In addition, the terminal device 122 communicates with the antennas 104 and 106, where the antennas 104 and 106 send information to the terminal device 122 by using a forward link 124, and receive information from the terminal device 122 by using a reverse link 126.

The embodiments of this application are applicable to downlink data transmission, or are applicable to uplink data transmission, or are applicable to device-to-device (device to device, D2D) data transmission. For example, for downlink data transmission, a transmit end device is a base station, and a corresponding receive end device is UE; for uplink data transmission, a transmit end device is UE, and a corresponding receive end device is a base station; and for D2D data transmission, a sending device is UE, and a corresponding receiving device is also UE. This is not limited in the embodiments of this application.

For example, in a frequency division duplex (frequency division duplex, FDD) system, the forward link 118 may use a frequency band different from that used by the reverse link 120, and the forward link 124 may use a frequency band different from that used by the reverse link 126.

For another example, in a time division duplex (time division duplex, TDD) system and a full duplex (full duplex) system, the forward link 118 and the reverse link 120 may use a same frequency band, and the forward link 124 and the reverse link 126 may use a same frequency band.

Each antenna (or an antenna group including a plurality of antennas) and/or area designed for communication are/is referred to as a sector of the network device 102. For example, the antenna group may be designed to communicate with a terminal device in the sector of a coverage area of the network device 102. In a process in which the network device 102 communicates with the terminal device 116 and the terminal device 122 by using the forward link 118 and the forward link 124, respectively, a transmit antenna of the network device 102 can improve a signal-to-noise ratio of the forward link 118 and a signal-to-noise ratio of the forward link 124 through beamforming. In addition, compared with a manner in which a network device sends signals to all terminal devices by using a single antenna, when the network device 102 sends, through beamforming, signals to the terminal device 116 and the terminal device 122 that are randomly distributed in a related coverage area, a mobile device in a neighboring cell is less interfered.

The network device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain (for example, generate, receive from another communications apparatus, or store in a memory) a specific quantity of data bits that need to be sent to the wireless communications receiving apparatus through a channel. The data bits may be included in a transport block (or a plurality of transport blocks) of data. The transport block may be segmented to generate a plurality of code blocks.

In addition, the communications system 100 may be a public land mobile network (PLMN) network, or a device-to-device (device to device, D2D) network, or a machine-to-machine (machine to machine, M2M) network, or another network. FIG. 1 is merely a simplified schematic diagram that is used as an example for ease of understanding, and the network may further include another network device that is not drawn in FIG. 1.

Figure 2:
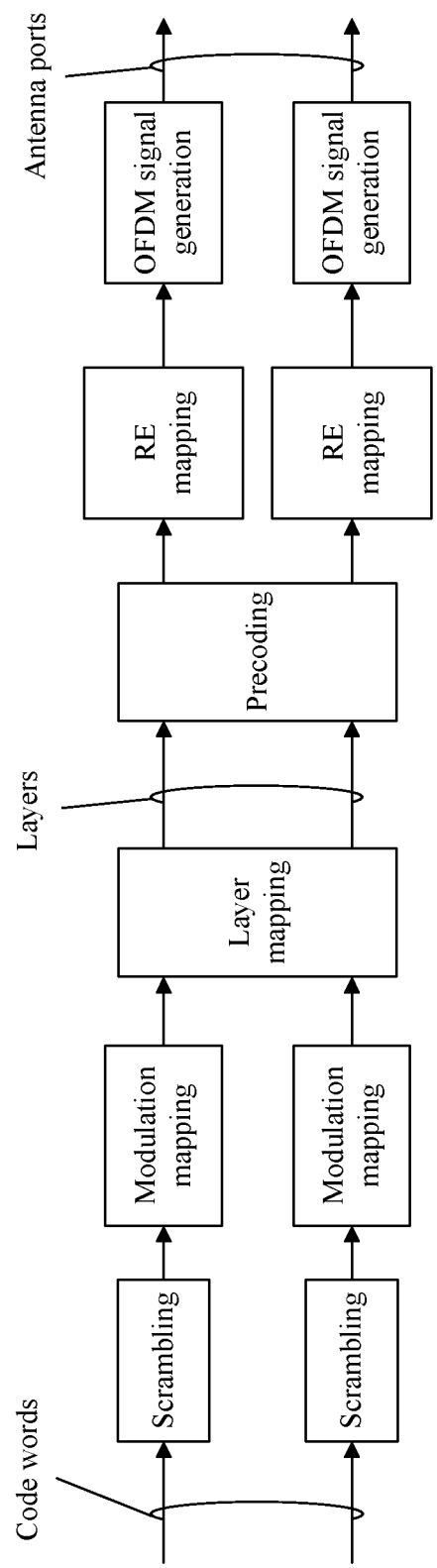
FIG. 2 is a schematic diagram of a downlink physical channel processing procedure used in an existing LTE system.

For ease of understanding of the embodiments of this application, the following briefly describes a downlink physical channel processing procedure in an LTE system with reference to FIG. 2. FIG. 2 is a schematic diagram of a downlink physical channel processing procedure used in an existing LTE system. A processing object of the downlink physical channel processing procedure is a code word. A code word is usually a bit stream that has been encoded (including at least channel coding). After scrambling (scrambling) is performed on the code word (code word), a scrambled bit stream is generated. After modulation mapping (modulation mapping) is performed on the scrambled bit stream, a modulated symbol stream is obtained. The modulated symbol stream is mapped to a plurality of layers (layer) after layer mapping (layer mapping). For ease of differentiation and description, in the embodiments of this application, the symbol stream after the layer mapping may be referred to as a layer mapping spatial layer (or referred to as a layer mapping spatial stream or a layer mapping symbol stream). After precoding (precoding) is performed on the layer mapping spatial layer, a plurality of precoded data streams (or referred to as precoded symbol streams) are obtained. The precoded symbol streams are mapped onto a plurality of REs after resource element (resource element, RE) mapping. Then, orthogonal frequency division multiplexing (orthogonal frequency division multiplexing, OFDM) modulation is performed on these REs, to generate an OFDM symbol stream. The OFDM symbol stream is then transmitted by using an antenna port (antenna port).

A precoding technology may refer to pre-processing of a to-be-transmitted signal at a transmit end when a channel state is known, that is, processing of the to-be-transmitted signal by using a precoding matrix matching a channel resource, so that a precoded to-be-transmitted signal adapts to a channel, and complexity in cancellation of interference between channels by a receive end is reduced. Therefore, received signal quality (such as a signal to interference plus noise ratio (signal to interference plus noise ratio, SINR)) is improved through precoding processing of a transmitted signal. Therefore, by using the precoding technology, a transmit end device and a plurality of receive end devices can implement transmission on a same time-frequency resource, that is, multi-user multiple-input multiple-output (multiple user multiple input multiple output, MU-MIMO) is implemented. It should be noted that, related description of the precoding technology is merely used as an example, and is not intended to limit the protection scope of the embodiments of this application. In a specific implementation process, precoding may be performed in another manner (for example, when a channel matrix cannot be learned, precoding is performed by using a preset precoding matrix or in a weighted processing manner), and detailed content is not described in this specification.

However, when channel conditions rapidly change or when CSI cannot be obtained in other cases, the receive end usually feeds back CSI of a long-term broadband. A precoding matrix determined based on such CSI feedback is inaccurate, and cannot accurately adapt to a current channel state. Therefore, a precoded to-be-transmitted signal cannot be successfully demodulated by the receive end, causing deterioration in quality of a received signal.

A currently known transmission scheme uses a plurality of precoding vectors to perform precoder cycling on a same data stream, and a diversity gain is obtained through cycling of the plurality of precoding vectors, so as to be applicable to a scenario in which channel conditions rapidly change or CSI cannot be accurately obtained. This transmission scheme may be referred to as precoder cycling. It may be understood that, precoder cycling is a transmission scheme of diversity transmission.

However, in a current technology, when using the transmission scheme of precoder cycling, the transmit end does not obtain CSI that is obtained through measurement based on the transmission scheme. Actually, during channel measurement, the receive end usually performs channel measurement based on a transmission scheme of closed-loop spatial multiplexing (closed-loop spatial multiplexing, CLSM), and CSI that is fed back is usually applicable to the transmission scheme of CLSM, and cannot meet a diversity transmission requirement.

Therefore, a solution needs to be provided, to feed back CSI based on a transmission scheme of precoder cycling, so that a transmit end device can obtain a plurality of precoding matrices that can adapt to a current channel state, to perform precoder cycling, thereby improving received quality of a signal.

Usually, to obtain a precoding matrix that can adapt to a channel, the transmit end may send a reference signal to perform channel measurement in advance, and obtain CSI that is obtained by the receive end through channel measurement, so that a relatively accurate precoding matrix is determined to perform precoding processing on to-be-sent data.

In this application, the reference signal may be a non-precoded (non-precoded) reference signal or a precoded reference signal (or referred to as a beamformed (beamformed) reference signal). The non-precoded reference signal is similar to a class A (Class A) reference signal in an LTE protocol, and the precoded reference signal is similar to a class B (Class B) reference signal in the LTE protocol. In the embodiments of this application, a difference between the two signals lies in that CSI fed back (or indicated) after channel measurement is different.

Specifically, the receive end can estimate a complete channel between a transmit antenna and a receive antenna based on the non-precoded reference signal, and CSI is obtained based on measurement of the complete channel. The receive end can measure an equivalent channel based on the precoded reference signal, and CSI is obtained based on measurement of the equivalent channel. Therefore, it may be understood that, although the receive end feeds back CSI based on both the types of reference signals, content included in the CSI that is fed back (or indicated) through channel measurement based on different reference signals may be different.

With the development of a multiple-antenna technology, because there is a relatively large quantity of antenna ports, high pilot overheads are caused by channel measurement (specifically, CSI measurement) using the non-precoded reference signal, a transmit power of each reference signal is relatively low, and channel measurement accuracy is relatively low. The precoded reference signal may be used to measure an equivalent channel matrix, and a terminal device obtains a beamformed equivalent channel through measurement, so that a quantity of antenna ports is reduced and pilot overheads are relatively low. Therefore, a transmit power is increased, and channel measurement accuracy is improved.

Therefore, both the non-precoded reference signal and the precoded reference signal can be used to determine a precoding matrix. For the non-precoded reference signal, the precoding matrix is determined based on measurement of a complete channel, and the precoding matrix may be used by a transmit end device to perform precoding on data. For the precoded reference signal, a precoding vector corresponding to an antenna port (that is, a beam) is determined based on measurement of an equivalent channel, that is, a precoding vector corresponding to an antenna port for data transmission is determined. In other words, the precoded reference signal is used for selection of a precoding vector, that is, selection of an antenna port, or selection of a beam. In this application, if the reference signal is a precoded reference signal, one antenna port may correspond to one precoding vector. When the transmit end transmits the precoded reference signal based on a precoding vector corresponding to one antenna port, the transmitted precoded reference signal has directionality. Therefore, a precoded reference signal sent by using an antenna port may be understood as a beam in a particular direction. In short, one antenna port corresponds to one beam.

It should be understood that, a communications manner to which the reference signal is applicable or a type of the reference signal is not particularly limited in this application. For example, for downlink data transmission, the transmit end may be a network device, the receive end may be a terminal device, and the reference signal may be, for example, a channel state information-reference signal (channel state information reference signal, CSI-RS); for uplink data transmission, the transmit end may be a terminal device, the receive end may be a network device, and the reference signal may be, for example, a sounding reference signal (sounding reference signal, SRS); and for device-to-device (device to device, D2D) data transmission, the transmit end may be a terminal device, the receive end may also be a terminal device, and the reference signal may be, for example, an SRS. However, it should be understood that, the types of reference signals listed above are merely an example used for description, and shall not constitute any limitation to this application, and a possibility of using another reference signal to implement a same or similar function is not precluded in this application.

It should be noted that, in the embodiments of this application, an antenna port (or a port for short) may be understood as a reference signal port, and one reference signal corresponds to one antenna port. The reference signal herein may include, for example, a channel state information-reference signal CSI-RS port or a DMRS port, or may include an SRS port or a DMRS port. Different types of reference signals are used to implement different functions. Description of the antenna port in this application may be a CSI-RS port, or a DMRS port, or an SRS port, or a DMRS port, and a person skilled in the art can understand a meaning thereof.

It should be further noted that, in the embodiments of this application, the transmission scheme (or referred to as a transmission manner or a transmission mechanism) may be a transmission scheme defined in an existing protocol (for example, the LTE protocol), or may be a transmission scheme defined in a related protocol in future 5G, and this is not particularly limited in the embodiments of this application. It should be understood that, the transmission scheme may be understood as a name for representing a technical solution used for data transmission, and shall not constitute any limitation to the embodiments of this application, and a possibility of using another name in a future protocol to replace the transmission scheme is not precluded in the embodiments of this application.

The following describes data transmission methods provided in this application with reference to the accompanying drawings by using a non-precoded reference signal and a precoded reference signal separately as examples.

It should be understood that, the technical solution in this application is applicable to a wireless communications system using a multiple-antenna technology. For example, the wireless communications system may be the communications system 100 shown in FIG. 1. The communications system may include at least one network device and at least one terminal device, and the network device and the terminal device may communicate by using a wireless air interface. For example, the network device in the communications system may correspond to the network device 102 shown in FIG. 1, and the terminal device may correspond to the terminal device 116 or 122 shown in FIG. 1.

In the wireless communications system described above, the network device and the terminal device may pre-store a same codebook (codebook), and a one-to-one correspondence between a plurality of precoding matrices and a plurality of indices (for example, PMIs) may be stored in the codebook. It may be understood that, the one-to-one correspondence between a plurality of precoding matrices and a plurality of PMIs may be pre-defined (for example, defined by a protocol) and configured in the network device and the terminal device; or may be pre-defined by the network device, and notified to the terminal device in advance by using signaling, so that the terminal device stores the one-to-one correspondence between a plurality of precoding matrices and a plurality of PMIs.

The following describes the data transmission methods in the embodiments of this application in detail with reference to FIG. 3 to FIG. 7.

Figures 3, 4:
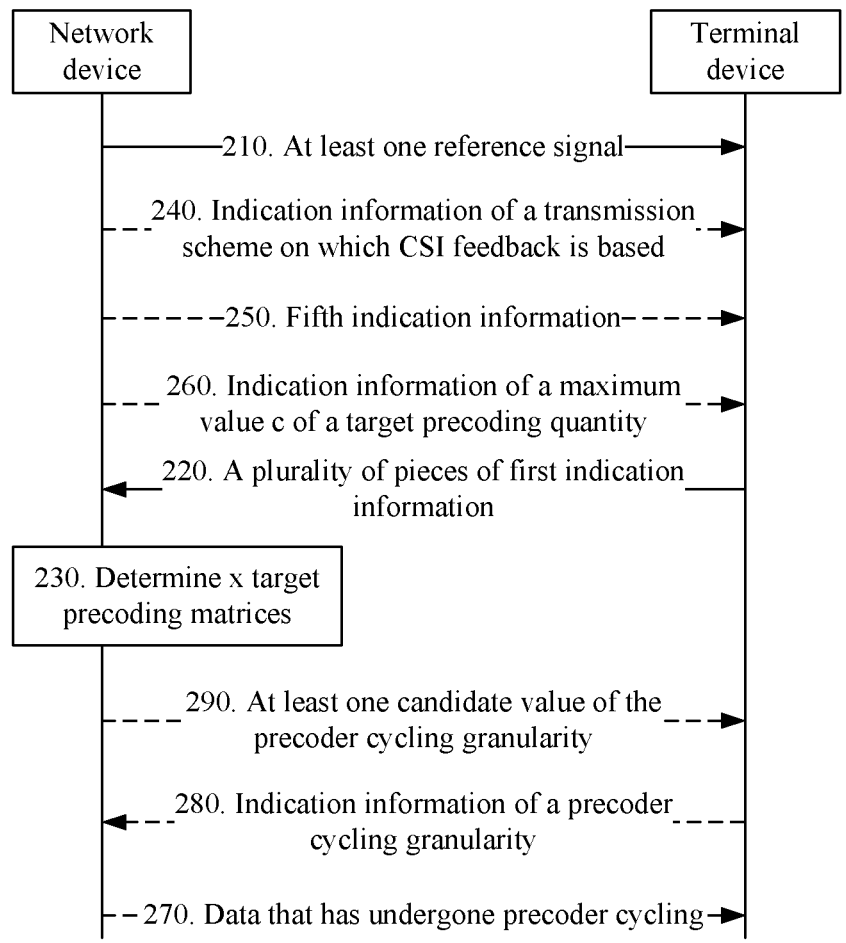
FIG. 3 is a schematic flowchart of a data transmission method according to an embodiment of this application.
FIG. 4 is a schematic diagram of a bitmap according to an embodiment of this application.

FIG. 3 is a schematic flowchart of a data transmission method 200 according to an embodiment of this application from a perspective of device interaction. Specifically, FIG. 3 shows a scenario of downlink data transmission. As shown in FIG. 3, the method 200 shown in FIG. 3 may include step 210 to step 260.

In step 210, a network device sends at least one reference signal used for channel measurement.

Correspondingly, in step 210, a terminal device receives the at least one reference signal used for channel measurement.

Specifically, the at least one reference signal may be a reference signal carried on a same reference signal resource. When one reference signal resource carries a plurality of reference signals, a resource configuration manner of the plurality of reference signals carried on the reference signal resource may be time division multiplexing (time division multiplexing, TDM), or may be frequency division multiplexing (frequency division multiplexing, FDM), or may be code division multiplexing (code division multiplexing, CDM). In other words, the network device may distinguish between different antenna ports by using TDM, FDM, CDM, and the like. If FDM or TDM is used, frequency-domain resources or time-domain resources occupied by reference signals of different antenna ports may be different. If CDM is used, time-frequency resources occupied by reference signals of different antenna ports may be the same, and different antenna ports are distinguished by using a multiplexing code. A resource configuration manner of the at least one first reference signal is not particularly limited in this application.

As an example rather than a limitation, in downlink data transmission, the reference signal may be, for example, a CSI-RS, and the reference signal resource may be, for example, a CSI-RS resource (CSI-RS resource).

In step 220, the terminal device feeds back a plurality of pieces of first indication information based on the at least one reference signal and a transmission scheme on which CSI feedback is based, where the plurality of pieces of first indication information are used to indicate x precoding matrices.

Correspondingly, in step 220, the network device receives the plurality of pieces of first indication information that are fed back by the terminal device based on the at least one reference signal and the transmission scheme on which CSI feedback is based. Then, in step 230, the network device determines x target precoding matrices based on the plurality of pieces of first indication information.

x is a quantity of target precoding matrices that need to be fed back, and x is an integer greater than 1.

Specifically, the terminal device may indicate one of the x target precoding matrices by using at least one piece of first indication information, and the network device may determine one of the x target precoding matrices based on a pre-stored codebook and the at least one piece of first indication information. In other words, one target precoding matrix may be indicated (or determined) by one piece of first indication information, or may be indicated (or determined) by a plurality of pieces of first indication information.

It should be understood that, the x target precoding matrices may be different from each other, or may be partly the same. This is not limited in this application.

In this embodiment of this application, the transmission scheme on which CSI feedback is based may be agreed in advance (for example, defined by a protocol), and configured in the network device and the terminal device, or may be determined by the network device and notified to the terminal device.

When the network device determines the transmission scheme on which CSI feedback is based, the network device may explicitly indicate, by using signaling, the terminal device of the transmission scheme on which CSI feedback is based. Optionally, the method further includes step 240: The network device sends indication information of the transmission scheme on which CSI feedback is based.

The terminal device may perform measurement and feedback based on the transmission scheme indicated by the indication information. Therefore, the indication information of the transmission scheme on which CSI feedback is based may also be referred to as indication information of a feedback type (feedback type).

As an example rather than a limitation, the transmission scheme on which CSI feedback is based includes: precoder cycling, precoder cycling-based space-time transmit diversity, precoder cycling-based space-frequency transmit diversity, precoder cycling-based cyclic delay diversity, or another precoder cycling-based transmission scheme.

It should be understood that, the transmission scheme on which CSI feedback is based may be understood as an assumption of a transmission scheme, and the terminal device performs CSI measurement and feedback based on the assumptive transmission scheme.

In this embodiment of this application, the reference signal may be a non-precoded reference signal (case 1) or a precoded reference signal (case 2). The following describes a specific method for indicating (or determining) a precoding matrix by using the first indication information with reference to case 1 and case 2.

Case 1: The reference signal is a non-precoded reference signal.

In case 1, the network device may send a plurality of non-precoded reference signals in step 210, and in step 220, the terminal device performs channel measurement based on the plurality of non-precoded reference signals sent by the network device. The channel measurement may be measurement of a complete channel between a transmit antenna and a receive antenna. The terminal device determines the plurality of precoding matrices based on the channel measurement, and indicates the plurality of target precoding matrices by feeding back the plurality of pieces of first indication information.

Optionally, the first indication information is a PMI, each of a plurality of PMIs includes three codebook indices $i_{1,1}$, $i_{1,2}$, and $i_2$, the three codebook indices in each PMI are used to jointly indicate one precoding matrix, and x PMIs are in a one-to-one correspondence with x precoding matrices.

Alternatively, in some cases, each PMI includes two PMI values (PMI value): $i_1$ and $i_2$.

$i_1$ corresponds to a pair of indices $\{i_{1,1}, i_{1,2}\}$ in the codebook, the pair of indices $\{i_{1,1}, i_{1,2}\}$ may be used to determine one precoding matrix set, the precoding matrix set may include at least one precoding matrix, the at least one precoding matrix includes a target precoding matrix; and $i_2$ corresponds to $i_2$ in the codebook, and may be used to further determine a target precoding matrix from the precoding matrix set indicated by the pair of indices $\{i_{1,1}, i_{1,2}\}$. Therefore, in other words, $i_1$ and $i_2$ may be used to jointly indicate one target precoding matrix.

Therefore, in case 1, one PMI may be used to determine one target precoding matrix, and x target precoding matrices may be indicated by using x PMIs.

In step 230, when receiving the x PMIs, the network device may determine a corresponding index based on the two PMI values included in each PMI, and then determine a precoding matrix indicated by each PMI as a target precoding matrix.

Case 2: The reference signal is a reference signal that has undergone precoder cycling.

In case 2, the network device may send at least one precoded reference signal in step 210. In step 220, the terminal device may perform channel measurement based on the at least one precoded reference signal sent by the network device. The channel measurement may be measurement of an equivalent channel. The terminal device determines the x target precoding matrices based on equivalent channel measurement.

Optionally, each of the at least one reference signal may be a reference signal that has undergone precoder cycling.

Precoder cycling may be understood as precoding of a reference signal on a reference signal resource by using at least two different precoding matrices. Parameters for representing precoder cycling may include a precoder cycling granularity and a quantity of precoding matrices. The precoder cycling granularity (or referred to as a precoder cycling size) indicates a quantity of consecutive resource units on which precoding is performed by using a same precoding matrix. The quantity of precoding matrices indicates a quantity of different precoding matrices used on one reference signal resource. In this embodiment of this application, the quantity of precoding matrices is denoted as y, and y is an integer greater than 1. In this embodiment of this application, a process in which precoder cycling is performed on y resource groups by using y precoding matrices separately is recorded as one cycling period. One cycling period indicates that a quantity of cycling times is 1, or cycling is performed once.

The resource unit herein may be understood as a minimum scheduling unit for physical layer transmission. Each resource unit may be a resource block RB (resource block, RB) defined in an LTE protocol, or may be an RB group (RB group, RBG) including a plurality of RBs, or may be ½ RB or ¼ RB, or may be one or more resource elements (resource element, RE), and this is not particularly limited in this application. If the resource unit is an RB, the precoder cycling granularity may also be referred to as a precoding resource block group size (precoding resource block group size, PRG size), or a cycling PRG size (cycling PRG size).

In addition, it should be further noted that, the at least one reference signal is in a one-to-one correspondence with at least one port. If there is only one reference signal, a precoding matrix of the reference signal includes only one column vector. If there are R reference signals, a precoding matrix of the R reference signals includes R column vectors.

In this embodiment of this application, measurement bandwidth of the reference signal may be divided into a plurality of physical resource groups (or resource groups for short), and each resource group may include at least one resource unit. The y resource groups may be divided in frequency domain or may be divided in time domain, and this is not particularly limited in this application.

The at least one precoded reference signal may be carried in the plurality of resource groups, each resource group carries the at least one precoded reference signal, and precoding matrices corresponding to signals carried in any two adjacent resource groups are different. It may be understood that, the resource group is an example of the precoder cycling granularity.

For example, the measurement bandwidth is divided into four consecutive subbands (subband) (it should be understood that, a subband is a resource group divided in frequency domain), and the four consecutive subbands are sequentially a subband #1, a subband #2, a subband #3, and a subband #4. A same precoding matrix is used for precoding on each subband, a precoding matrix used on the subband #1 is the same as that used on the subband #3, and a precoding matrix used on the subband #2 is the same as that used on the subband #4. Therefore, the precoder cycling granularity is one subband, and the quantity y of the precoding matrices is 2.

In this embodiment of this application, the terminal device may determine the x target precoding matrices based on the y precoding matrices corresponding to the received reference signal that has undergone precoder cycling. In a possible design, the terminal device may directly use x precoding matrices in the y precoding matrices used for precoder cycling as the x target precoding matrices. In this case, the terminal device may directly feed back, to the network device, a piece of indication information carrying the quantity x of the precoding matrices. The network device may select, based on the indication information from the y precoding matrices used for precoder cycling, the x precoding matrices for data transmission. In another possible design, the terminal device may determine the x target precoding matrices based on the y precoding matrices used for precoder cycling, where each target precoding matrix may be obtained through port selection based on at least one precoding matrix used for precoder cycling. In other words, when one target precoding matrix (for example, denoted as $P_B$) is determined based on one precoding matrix (for example, denoted as $P_A$), $P_B$ may be formed by combining all or some column vectors in $P_A$; and when one target precoding matrix (for example, denoted as $P_D$) is determined based on at least one precoding matrix (for example, denoted as $P_A$ and $P_C$), $P_D$ may be formed by linearly superposing some or all column vectors in $P_A$ and $P_C$.

The following describes in detail a specific method for determining x target precoding matrices through port selection and feeding back a plurality of pieces of first indication information.

In this embodiment of this application, if the quantity y of the precoding matrices used for precoder cycling is equal to the quantity x of the precoding matrices that need to be fed back, that is, y=x, the terminal device may determine the x target precoding matrices based on precoding matrices corresponding to resource groups in the measurement bandwidth, that is, determine one target precoding matrix based on at least one precoded reference signal carried by each resource group. It may be understood that, because precoder cycling is performed on the reference signal, when a quantity of cycling times is greater than 1, a plurality of resource groups may correspond to a same precoding matrix.

In this case, each of the y precoding matrices used for precoder cycling is used to determine one of the x target precoding matrices, and the y precoding matrices are in a one-to-one correspondence with the x target precoding matrices.

Optionally, the first indication information is a PMI, and each of a plurality of PMIs is used to indicate a port corresponding to one precoded reference signal.

Specifically, in case 2, each PMI includes an index, the index may be used to indicate a matrix, the matrix may include at least one column vector, and a quantity of columns of the matrix is related to a rank (rank). If the rank is R, the matrix includes R column vectors. Each column vector is used to determine one precoding vector, and the matrix with R columns may be used to determine a target precoding matrix with a rank of R.

In step 230, when receiving the plurality of PMIs, the network device may determine, based on the matrix indicated by the index in each PMI, a precoding matrix indicated by each PMI, so as to determine the x target precoding matrices. The following shows an example in case 2 in which a PMI is used to indicate (or determine) a target precoding matrix.

It is assumed that a matrix corresponding to a codebook index included in the PMI is:

$$\frac{1}{\sqrt{2}}[e_3^{(4)}] \text{ if the rank is 1; or}$$

$$\frac{1}{\sqrt{2}}[\,e_3^{(4)} \ \ e_0^{(4)}\,] \text{ if the rank is}$$

greater than 1 (for example, the rank is 2).

Therefore, matrices listed above are matrices corresponding to the PMI when the rank is 1 and 2 for four antenna ports.

If the rank is 1, the column vector is used to determine a precoding vector of a selected port, and the precoding vector is a target precoding matrix. 4 represents a quantity of ports, and 3 represents a currently selected port.

If the rank is greater than 1 (for example, the rank is 2), each column vector in the matrix is used to determine a precoding vector of a selected port, and the matrix may be used to determine a target precoding matrix with two columns. 4 represents a quantity of ports, 3 in the first column represents a currently selected port used for the first data layer, and 0 in the second column represents a currently selected port used for the second data layer.

The following shows another example in case 2 in which a PMI is used to indicate (or determine) a target precoding matrix.

It is assumed that an index value, of a codebook (codebook), included in the PMI is 12, and a matrix corresponding to the index of 12 is:

$$\frac{1}{\sqrt{2}}\begin{bmatrix} e_3^{(4)} \\ \alpha e_3^{(4)} \end{bmatrix} \text{ if the rank is 1; or}$$

$$\frac{1}{\sqrt{2}}\begin{bmatrix} e_0^{(4)} & e_3^{(4)} \\ \alpha e_0^{(4)} & \alpha e_3^{(4)} \end{bmatrix} \text{ if the rank}$$

is greater than 1 (for example, the rank is 2).

Therefore, matrices listed above are matrices corresponding to the PMI when the rank is 1 and 2 for eight antenna ports.

If the rank is 1, the column vector is used to determine a precoding vector of a selected port, and the precoding vector may correspond to two polarization directions, where 4 represents a quantity of ports, 3 represents a currently selected port, two $e_3^{(4)}$ are distinguished by using a polarization antenna phase factor (co-phase) $\alpha$, and a value of the polarization antenna phase factor $\alpha$ may be any value in [1, −1, j, −j]. The column vector may be used to determine a precoding vector used for data transmission, that is, a precoding vector corresponding to port 3 in a first polarization direction and a precoding vector corresponding to port 3 in a second polarization direction are spliced, to form the precoding vector. For example, the precoding vector corresponding to port 3 in the first polarization direction is $P_1$, and the precoding vector corresponding to port 3 in the second polarization direction is $P_2$, and therefore a precoding vector determined based on the column vector is:

$$\begin{bmatrix} P_1 \\ \alpha P_2 \end{bmatrix},$$

and the precoding vector is a target precoding matrix.

If the rank is greater than 1 (for example, the rank is 2), each column vector in the matrix is used to determine a precoding vector of a selected port, and the matrix may be used to determine a target precoding matrix with two columns. Each precoding vector in the target precoding matrix may correspond to two polarization directions, where 4 represents a quantity of ports, 0 in the first column represents a currently selected port used for the first data layer, 3 in the second column represents a currently selected port used for the second data layer, and each column vector may be distinguished by using a polarization antenna phase factor $\alpha$. It is assumed that a precoding vector corresponding to port 3 in a first polarization direction is $P_1$, a precoding vector corresponding to port 3 in a second polarization direction is $P_2$, a precoding vector corresponding to port 0 in the first polarization direction is $P_3$, and a precoding vector corresponding to port 0 in the second polarization direction is $P_4$. The target precoding matrix determined based on the matrix is:

$$\begin{bmatrix} P_3 & P_1 \\ \alpha P_4 & \alpha P_2 \end{bmatrix}.$$

It should be noted that, each column vector in the target precoding matrix determined based on the first indication information fed back by the terminal device may be in a one-to-one correspondence with a port configured by the network device. In this case, each column vector in the target precoding matrix determined by the network device based on the first indication information is a precoding vector used by a corresponding port. Alternatively, the precoding vector fed back by the terminal device may correspond to a plurality of ports configured by the network device (that is, port combination). In this case, the precoding vector may be linear superposition of precoding vectors used by the plurality of ports. In this case, the terminal device may feed back the plurality of ports and a linear combination coefficient to the network device, so that the network device determines the precoding vector.

It should be understood that, a method for port combination by the terminal device may be the same as that in the prior art. For brevity, detailed description of a specific process of port combination is omitted herein.

In this embodiment of this application, if the quantity y of the precoding matrices used for precoder cycling is greater than the quantity x of the precoding matrices that need to be fed back, that is, y>x, the terminal device may first select x precoding matrices from the y precoding matrices and notify the network device of the x precoding matrices by using second indication information, and then the terminal device may determine the x target precoding matrices based on the x precoding matrices, and feed back the x target precoding matrices to the network device by using the first indication information.

Optionally, the method further includes:

sending, by the terminal device, second indication information, where the second indication information indicates x precoding matrices in the y precoding matrices used for precoder cycling, each of the x precoding matrices used for precoder cycling is used to determine one of the x target precoding matrices, and the x precoding matrices used for precoder cycling are in a one-to-one correspondence with the x target precoding matrices.

Correspondingly, the network device receives the second indication information, and determines, based on the second indication information, x precoding matrices from the y precoding matrices used for precoder cycling.

The network device determines all of the x target precoding matrices based on the plurality of pieces of first indication information and all of the x precoding matrices used for precoder cycling.

In a possible implementation, the second indication information may be a bitmap, a plurality of bits in the bitmap are in a one-to-one correspondence with the y precoding matrices, or in a one-to-one correspondence with y resource groups in one cycling period that are included in the measurement bandwidth, and a value of each bit is used to indicate whether a corresponding precoding matrix is selected, or is used to indicate whether a precoding matrix of a reference signal carried by a corresponding resource group is selected. For example, a bit in the bitmap is set to "0", indicating that a corresponding precoding matrix is not selected, and a bit in the bitmap is set to "1", indicating that a corresponding precoding matrix is selected. It may be understood that, because precoder cycling is performed on the reference signal, when a quantity of cycling times is greater than 1, a plurality of resource groups may correspond to a same precoding matrix.

For example, it is assumed that there are four subbands (that is, an example of a resource group) and the quantity y of the precoding matrices is 4. A quantity of cycling times is 1, the four subbands are in a one-to-one correspondence with the four precoding matrices, and the quantity x of the target precoding matrices that need to be fed back is 2. FIG. 4 is a schematic diagram of a bitmap according to an embodiment of this application. As shown in FIG. 4, four bits in the bitmap are "0101", indicating that precoding matrices corresponding to a subband #1 and a subband #3 are not selected, and precoding matrices corresponding to a subband #2 and a subband #4 are selected.

It should be understood that, the method using a bitmap to indicate the x selected precoding matrices is merely a possible implementation, and shall not constitute any limitation to this application, and another method may be used in this application to indicate the x selected resource groups.

The specific method for indicating (or determining) the target precoding matrix by using the first indication information is described above in detail with reference to case 1 and case 2. It may be understood that, the foregoing described method for indicating the target precoding matrix by using the first indication information is an indirect indication method, and the network device can determine the x target precoding matrices based on the plurality of pieces of received first indication information.

In this embodiment of this application, the terminal device can measure and determine a plurality of target precoding matrices based on the transmission scheme on which CSI feedback is based. The quantity x of the target precoding matrices may be agreed in advance (for example, defined by a protocol), or may be determined by the network device based on a current channel state and notified to the terminal device by using signaling.

When the network device determines the quantity x of the target precoding matrices, optionally, the method 200 further includes step 250: The network device sends fifth indication information, where the fifth indication information indicates the quantity x of the target precoding matrices.

Optionally, the fifth indication information may be carried in any one of the following signaling: a radio resource control (radio resource control, RRC) message, a Media Access Control (Media Access Control, MAC)-control element (control element, CE), or downlink control information (downlink control information, DCI).

Optionally, the method 200 further includes step 260: The network device sends indication information of a maximum value c of the quantity x of the target precoding matrices, where c≥x, and c is an integer.

The network device may further limit the maximum value of the quantity of the target precoding matrices fed back by the terminal device, to limit signaling overheads caused by feedback of the terminal device.

Optionally, the indication information of the maximum value c of the target precoding quantity may be carried in any one of the following signaling: an RRC message, a MAC-CE, or DCI.

It should be understood that, the signaling listed above for carrying the indication information is merely an example used for description, and shall not constitute any limitation to this application.

Optionally, the method 200 further includes step 270: The network device performs precoder cycling on to-be-sent data based on the x target precoding matrices determined in step 230, and sends data that has undergone precoder cycling.

Specifically, the network device may directly perform precoding on the to-be-sent data based on the x target precoding matrices determined in step 230, or perform mathematical transformation or mathematical calculation based on the x target precoding matrices determined in step 230, to obtain a plurality of precoding matrices used for a precoding operation, and perform precoder cycling on the to-be-sent data based on the plurality of obtained precoding matrices. After performing precoder cycling on the data, the network device obtains and sends the data that has undergone precoder cycling.

In this embodiment of this application, a transmission scheme used for downlink data transmission may be agreed in advance (for example, defined by a protocol), and configured in the network device and the terminal device, or may be determined by the network device based on CSI measured and fed back by the terminal device.

It should be understood that, in this embodiment of this application, for ease of description, it is assumed that the transmission scheme on which CSI feedback is based is the same as the transmission scheme used for downlink data transmission, and both are precoder cycling. However, this shall not constitute any limitation to this application, and the transmission scheme on which CSI feedback is based may be the same as or different from the transmission scheme used for downlink data transmission. This is not limited in this application.

Optionally, the method 200 further includes step 280: The terminal device sends indication information of a precoder cycling granularity.

After learning the transmission scheme used for downlink data transmission, the terminal device may further feed back the indication information of the precoder cycling granularity to the network device. Specifically, the terminal device may perform measurement by using a plurality of possible precoder cycling granularities, and feed back an optimal precoder cycling granularity in a metric criterion to the network device. The network device performs precoder cycling based on the optimal precoder cycling granularity, thereby further helping obtain a diversity gain, and further improving data transmission reliability.

The metric criterion may include but is not limited to: maximization of a signal to interference plus noise ratio (signal-to-interference-plus-noise ratio, SINR), maximization of a Shannon capacity, or minimization of a mean square error (mean square error, MSE) between a quantized equivalent channel matrix corresponding to the PMI and a measured equivalent channel matrix. For brevity, description of a same or similar case is omitted below.

Further, the terminal device may select an optimal precoder cycling granularity in a metric criterion from at least one candidate value of the precoder cycling granularity. The at least one candidate value of the precoder cycling granularity may be pre-determined (for example, defined by a protocol), or may be determined by the network device and notified to the terminal device by using signaling.

When the network device notifies the terminal device by using signaling, optionally, the method 200 further includes step 290: The network device sends at least one candidate value of the precoder cycling granularity.

The network device may send the candidate value of the precoder cycling granularity to the terminal device in advance, and the terminal device may perform measurement separately based on the at least one candidate value, to determine an optimal precoder cycling granularity in a metric criterion and feed back the optimal precoder cycling granularity to the network device.

Therefore, the terminal device may select the optimal precoder cycling granularity in a relatively small range, so that measurement complexity of the terminal device can be reduced.

Therefore, according to this embodiment of this application, the terminal device feeds back the indication information used for determining the plurality of target precoding matrices, so that the network device can determine, based on the feedback, the plurality of target precoding matrices used for precoder cycling, to meet a requirement of the transmission scheme. In this way, a higher diversity gain can be obtained, thereby helping improve data transmission reliability, and helping improve robustness of the communications system.

Figure 5:
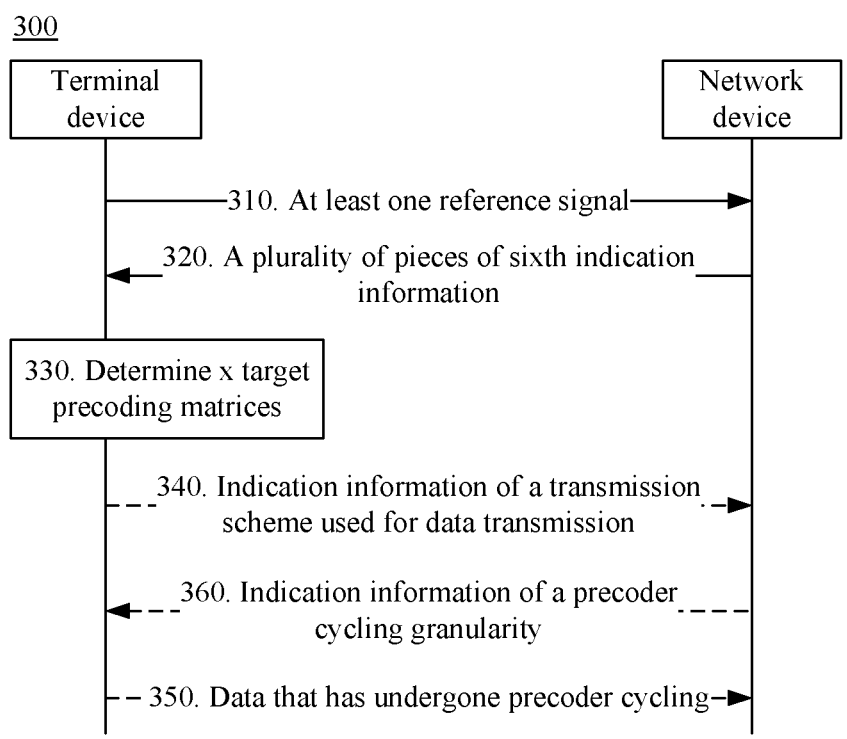
FIG. 5 is a schematic flowchart of a data transmission method according to another embodiment of this application.

FIG. 5 is a schematic flowchart of a data transmission method 300 according to another embodiment of this application from a perspective of device interaction. Specifically, FIG. 5 shows a scenario of uplink data transmission. As shown in FIG. 5, the method 300 shown in FIG. 5 may include step 310 to step 350.

In step 310, a terminal device sends at least one reference signal used for channel measurement.

Correspondingly, in step 310, a network device receives the at least one reference signal used for channel measurement.

Specifically, the at least one reference signal may be a reference signal carried on a same reference signal resource. When one reference signal resource carries a plurality of reference signals, a resource configuration manner of the plurality of reference signals carried on the reference signal resource may be TDM, or may be FDM, or may be CDM.

As an example rather than a limitation, in uplink data transmission, the reference signal may be, for example, an SRS, and the reference signal resource may be, for example, an SRS resource (SRS resource).

It should be understood that, a specific process of step 310 is similar to that of step 210 in the method 200. For brevity, details are not described herein again.

In step 320, the network device sends a plurality of pieces of sixth indication information based on the at least one reference signal and a transmission scheme on which CSI measurement is based, where the plurality of pieces of sixth indication information are used to indicate x target precoding matrices.

As an example rather than a limitation, the transmission scheme on which CSI measurement is based includes: precoder cycling, precoder cycling-based space-time transmit diversity, precoder cycling-based space-frequency transmit diversity, precoder cycling-based cyclic delay diversity, or another precoder cycling-based transmission scheme.

It should be understood that, the transmission scheme on which CSI measurement is based may be understood as an assumption of a transmission scheme, and the network device performs CSI measurement and indication based on the assumptive transmission scheme.

x is a quantity of target precoder cycling that needs to be indicated. The network device may determine, based on a current channel state, how many precoding matrices are required to perform cycling, that is, determine the quantity x of the target precoding matrices that need to be indicated. Therefore, the network device may directly determine the x target precoding matrices based on the quantity x of target precoder cycling.

In this embodiment of this application, a downlink channel measurement and feedback method in the LTE can also be used as a specific uplink channel measurement and indication method, and a precoding matrix is indicated by using a PMI. For example, for a non-precoded reference signal, three codebook indices are used to jointly indicate one precoding matrix; and for a precoded reference signal, a port indicated by a PMI may be used to determine a precoding matrix.

It should be understood that, a specific process of step 320 is the same as that of step 220 in the method 200. For brevity, details are not described herein again.

Correspondingly, the terminal device receives the plurality of pieces of sixth indication information in step 320, and in step 330, the terminal device determines the x target precoding matrices based on the plurality of pieces of sixth indication information.

In this embodiment of this application, the reference signal may be a non-precoded reference signal or a precoded reference signal. Methods for determining the target precoding matrices by using indication information (that is, sixth indication information) of the two types of reference signals are different.

Optionally, when y=x, each of the y precoding matrices used for precoder cycling is used to determine one of the x target precoding matrices, and the y precoding matrices are in a one-to-one correspondence with the x target precoding matrices.

Optionally, when y>x, the method 300 further includes:

sending, by the network device, seventh indication information, where the seventh indication information is used to indicate x precoding matrices in the y precoding matrices used for precoder cycling, each of the x precoding matrices used for precoder cycling is used to determine one of the x target precoding matrices, and the x precoding matrices used for precoder cycling are in a one-to-one correspondence with the x target precoding matrices.

It should be understood that, the specific method for determining the x target precoding matrices by using the first indication information has been described in detail in the foregoing method 200 with reference to case 1 and case 2, and in this embodiment, the sixth indication information and the seventh indication information, and the first indication information and the second indication information are indication information named for ease of distinguishing between an uplink and a downlink, and have same functions. Therefore, when receiving the plurality of pieces of sixth indication information, the terminal device may determine the x target precoding matrices based on the plurality of pieces of sixth indication information; or when receiving the sixth indication information and the seventh indication information, the terminal device may determine the x target precoding matrices based on the sixth indication information and the seventh indication information.

It should be understood that, a specific method for determining the x target precoding matrices by the terminal device based on the plurality of pieces of sixth indication information in step 330 is the same as a specific method for determining the x target precoding matrices by the network device based on the plurality of pieces of first indication information in step 230 in the method 200, to indirectly indicate the x target precoding matrices; and a specific method for determining the x target precoding matrices by the terminal device based on the sixth indication information and the seventh indication information in step 330 is the same as a specific method for determining the x target precoding matrices by the network device based on the first indication information and the second indication information in step 230 in the method 200. For brevity, details are not described herein again.

In this embodiment of this application, a transmission scheme used for uplink data transmission may be agreed in advance (for example, defined by a protocol), and configured in the network device and the terminal device, or may be determined by the network device and notified to the terminal device by using signaling.

When the network device determines the transmission scheme, optionally, the method 300 further includes step 340: The network device sends indication information of a transmission scheme used for uplink data transmission.

Therefore, the terminal device can determine the x precoding matrices based on the plurality of pieces of received sixth indication information based on the transmission scheme of precoder cycling.

It may be understood that, the transmission scheme on which CSI measurement by the network device is based may be the same as or different from the transmission scheme used for uplink data transmission. For example, the network device may perform measurement based on a plurality of transmission schemes, and select an optimal transmission scheme based on a metric criterion for data transmission. This is not limited in this application.

It is assumed that the transmission scheme used for uplink data transmission is precoder cycling. Optionally, the method further includes step 350: The terminal device performs precoder cycling on to-be-sent data based on the x target precoding matrices, and sends data that has undergone precoder cycling.

It should be understood that, a specific process of step 350 is the same as that of step 270 in the method 200. For brevity, details are not described herein again.

Optionally, the method 300 further includes step 360: The network device sends indication information of a precoder cycling granularity.

Specifically, the network device may determine, through measurement, an optimal precoder cycling granularity in a metric criterion, and notify the terminal device of the precoder cycling granularity by using the indication information. After learning the precoder cycling granularity, the terminal device may perform precoder cycling on the to-be-sent data based on the precoder cycling granularity and the x target precoding matrices obtained through determining in step 330.

Therefore, in this embodiment of this application, the network device sends the indication information for determining the plurality of target precoding matrices, so that the terminal device can determine, based on the indication information, the plurality of target precoding matrices used for precoder cycling, to meet a requirement of the transmission scheme of precoder cycling. In this way, a higher diversity gain can be obtained, thereby helping improve data transmission reliability, and helping improve robustness of the communications system.

Figure 6:
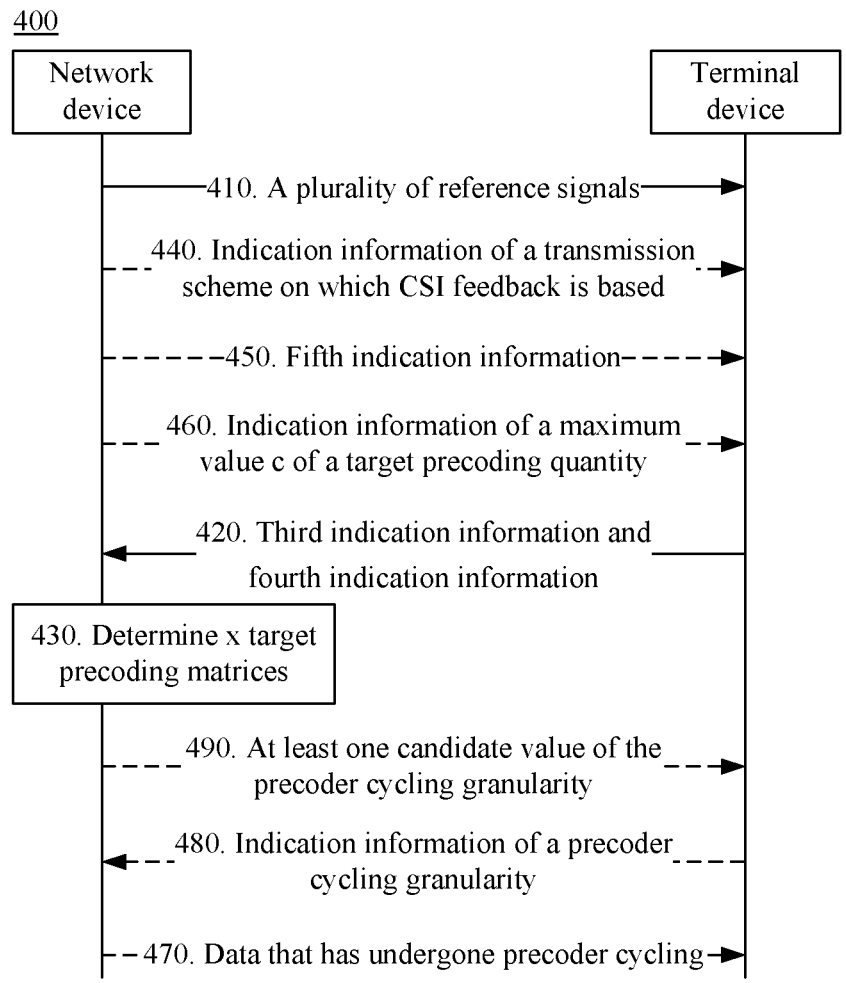
FIG. 6 is a schematic flowchart of a data transmission method according to still another embodiment of this application.

FIG. 6 is a schematic flowchart of a data transmission method 400 according to still another embodiment of this application from a perspective of device interaction. Specifically, FIG. 6 shows a scenario of downlink data transmission. As shown in FIG. 6, the method 400 shown in FIG. 6 may include step 410 to step 490.

In step 410, a network device sends a plurality of reference signals used for channel measurement.

Correspondingly, in step 410, a terminal device receives the plurality of reference signals used for channel measurement.

Specifically, the plurality of reference signals may be reference signals carried on a same reference signal resource. A specific process of step 410 is the same as that of step 210 in the method 200. For brevity, details are not described herein again.

In this embodiment of this application, the reference signal sent by the network device may be a non-precoded reference signal, and the terminal device may perform channel measurement based on a plurality of non-precoded reference signals sent by the network device and a transmission scheme on which CSI feedback is based. The channel measurement may be measurement of a complete channel between a transmit antenna and a receive antenna. The terminal device determines x target precoding matrices based on the channel measurement, and feeds back indication information of the x target precoding matrices to the network device in step 420.

x is a quantity of target precoding matrices that need to be fed back, and x is an integer greater than 1.

As an example rather than a limitation, the transmission scheme on which CSI feedback is based includes: precoder cycling, precoder cycling-based space-time transmit diversity, precoder cycling-based space-frequency transmit diversity, precoder cycling-based cyclic delay diversity, or another precoder cycling-based transmission scheme.

It should be understood that, the transmission scheme on which CSI feedback is based may be understood as an assumption of a transmission scheme, and the terminal device performs CSI measurement and feedback based on the assumptive transmission scheme.

Specifically, as described in the method 200, a PMI that is fed back based on the non-precoded reference signal may include two PMI values, where one PMI value $i_1$ may correspond to a pair of indices $\{i_{1,1}, i_{1,2}\}$ in a codebook, one precoding matrix set may be determined by using the pair of indices $\{i_{1,1}, i_{1,2}\}$, and the precoding matrix set may include at least one precoding matrix.

In this embodiment of this application, the indication information (that is, third indication information) used for indicating the x target precoding matrices may be the PMI value $i_1$ in the foregoing PMI. The PMI value $i_1$ may be used to indicate one precoding matrix set (denoted as a first precoding matrix set for ease of differentiation and description), and the first precoding matrix set may include z precoding matrices, where z>1, and z is an integer.

When a quantity of precoding matrices included in the first precoding matrix set is equal to the quantity x of the target precoding matrices, that is, z=x, the terminal device may feed back only the third indication information, to indicate the first precoding matrix set by using the third indication information.

When a quantity of precoding matrices included in the first precoding matrix set is greater than the quantity x of the target precoding matrices, that is, z>x, the terminal device may further select x target precoding matrices from the first precoding matrix set indicated by the third indication information, and notify the network device by using fourth indication information.

In a possible implementation, the at least one precoding matrix included in each precoding matrix set in the codebook may be divided into a plurality of groups, and each group includes at least one precoding matrix. In this embodiment of this application, each group may include x precoding matrices. A one-to-one correspondence between the plurality of groups and a plurality of indices is pre-defined in the codebook. The terminal device may send, to the network device, an index of a group to which the x selected precoding matrices belong, that is, the fourth indication information may be the index of the group to which the precoding matrices belong.

For example, the first precoding matrix includes four precoding matrices (for example, denoted as $P_1$, $P_2$, $P_3$, and $P_4$), the four precoding matrices are divided into two groups, each group includes two precoding matrices, and a one-to-one correspondence between precoding matrices included in each group and an index of each group is shown in the following table:

TABLE 1

| Index (index) | Precoding matrix |
|---|---|
| 0 | $P_1$, $P_2$ |
| 1 | $P_3$, $P_4$ |
| 2 | $P_1$, $P_3$ |
| 3 | $P_2$, $P_4$ |

TABLE 1-continued

| Index (index) | Precoding matrix |
| --- | --- |
| 4 | $P_1, P_4$ |
| 5 | $P_2, P_3$ |

In other words, the terminal device indicates a mapping table of a correspondence between precoding matrices and an index by using the third indication information, and then further indicates a group of precoding matrices in the mapping table by using the fourth indication information.

In another possible implementation, the fourth indication information may be a bitmap. A plurality of bits in the bitmap are in a one-to-one correspondence with a plurality of precoding matrices included in a precoding matrix set, and a value of each bit is used to indicate whether a corresponding precoding matrix is selected.

For example, if the first precoding matrix set includes four precoding matrices (for example, denoted as $P_1$, $P_2$, $P_3$, and $P_4$), the bitmap includes four bits that are in a one-to-one correspondence with the four precoding matrices. A bit in the bitmap is set to "0", indicating that a corresponding precoding matrix is not selected, and a bit in the bitmap is set to "1", indicating that a corresponding precoding matrix is selected. For example, it may be understood that, a bitmap shown in FIG. 4 indicates that precoding matrices $P_2$ and $P_4$ are selected.

Based on the foregoing description, the terminal device may indicate, to the network device, the x target precoding matrices by using the third indication information and the fourth indication information. Based on a same method, in step 430, the network device determines the x target precoding matrices based on the third indication information and the fourth indication information.

In this embodiment of this application, the transmission scheme on which CSI feedback is based may be agreed in advance (for example, defined by a protocol), and configured in the network device and the terminal device, or may be determined by the network device and notified to the terminal device.

When the network device determines the transmission scheme on which CSI feedback is based, the network device may explicitly indicate, by using signaling, the terminal device of the transmission scheme on which CSI feedback is based. Optionally, the method further includes step 440: The network device sends indication information of a transmission scheme on which CSI feedback is based.

The terminal device may perform measurement and feedback based on the transmission scheme indicated by the indication information. Therefore, the indication information of the transmission scheme on which CSI feedback is based may also be referred to as indication information of a feedback type (feedback type).

As an example rather than a limitation, the transmission scheme on which CSI feedback is based includes: precoder cycling, precoder cycling-based space-time transmit diversity, precoder cycling-based space-frequency transmit diversity, precoder cycling-based cyclic delay diversity, or another precoder cycling-based transmission scheme.

It may be understood that, the transmission scheme on which CSI feedback is based may be the same as or different from a transmission scheme used for downlink data transmission. This is not limited in this application.

In this embodiment of this application, the terminal device can measure and determine a plurality of target precoding matrices based on the transmission scheme on which CSI feedback is based. The quantity x of the target precoding matrices may be agreed in advance (for example, defined by a protocol), or may be determined by the network device based on a current channel state and notified to the terminal device by using signaling.

When the network device determines the quantity x of the target precoding matrices, optionally, the method 400 further includes step 450: The network device sends fifth indication information, where the fifth indication information indicates the quantity x of the target precoding matrices that need to be fed back.

Optionally, the fifth indication information may be carried in any one of the following signaling: an RRC message, a MAC-CE, or DCI.

Optionally, the method 400 further includes step 460: The network device sends indication information of a maximum value c of the quantity of the target precoding matrices.

The network device may further limit the maximum value of the quantity of the target precoding matrices fed back by the terminal device, to limit signaling overheads caused by feedback of the terminal device.

Optionally, the indication information of the maximum value c of the target precoding quantity may be carried in any one of the following signaling: an RRC message, a MAC-CE, or DCI.

It should be understood that, the signaling listed above for carrying the indication information is merely an example used for description, and shall not constitute any limitation to this application.

Optionally, the method 400 further includes step 470: The network device performs precoder cycling on to-be-sent precoded data based on the x target precoding matrices determined in step 430, and sends data that has undergone precoder cycling.

Specifically, the network device may directly perform precoding on the to-be-sent data based on the x target precoding matrices determined in step 430, or perform mathematical transformation or mathematical calculation based on the x target precoding matrices determined in step 430, to obtain a plurality of precoding matrices used for a precoding operation, and perform precoder cycling on the to-be-sent data based on the plurality of obtained precoding matrices. After performing precoder cycling on the data, the network device obtains and sends the data that has undergone precoder cycling.

It should be understood that, the x target precoding matrices fed back by the terminal device are not limited to being used to perform precoder cycling on the data. For example, after determining the x target precoding matrices based on the third indication information and the fourth indication information, the network device may further select (for example, randomly select), from the x target precoding matrices, a precoding matrix used for performing precoding on data. This application imposes no limitation on functions of the x target precoding matrices.

In this embodiment of this application, the transmission scheme used for downlink data transmission may be agreed in advance (for example, defined by a protocol), and configured in the network device and the terminal device, or may be determined by the network device based on CSI measured and fed back by the terminal device.

It should be understood that, in this embodiment of this application, for ease of description, it is assumed that the transmission scheme on which CSI feedback is based is the same as the transmission scheme used for downlink data transmission, and both are precoder cycling. However, this shall not constitute any limitation to this application, and the transmission scheme on which CSI feedback is based may be the same as or different from the transmission scheme used for downlink data transmission. This is not limited in this application.

Optionally, the method 400 further includes step 480: The terminal device sends indication information of a precoder cycling granularity.

After learning the transmission scheme used for downlink data transmission, the terminal device may further feed back the indication information of the precoder cycling granularity to the network device. Specifically, the terminal device may perform measurement by using a plurality of possible precoder cycling granularities, and feed back an optimal precoder cycling granularity in a metric criterion to the network device. The network device performs precoder cycling based on the optimal precoder cycling granularity, thereby further helping obtain a diversity gain, and further improving data transmission reliability.

Further, the terminal device may select the optimal precoder cycling granularity in a metric criterion from at least one candidate value of the precoder cycling granularity. The at least one candidate value of the precoder cycling granularity may be pre-determined (for example, defined by a protocol), or may be determined by the network device and notified to the terminal device by using signaling.

When the network device notifies the terminal device by using signaling, optionally, the method 400 further includes step 490: The network device sends at least one candidate value of the precoder cycling granularity.

The network device may send the candidate value of the precoder cycling granularity to the terminal device in advance, and the terminal device may perform measurement separately based on the at least one candidate value, to determine an optimal precoder cycling granularity in a metric criterion, and feed back the optimal precoder cycling granularity to the network device in step 460.

Therefore, the terminal device may select the optimal precoder cycling granularity in a relatively small range, so that measurement complexity of the terminal device can be reduced.

Therefore, according to this embodiment of this application, the terminal device feeds back the indication information used for determining the plurality of target precoding matrices, so that the network device can determine, based on the feedback, the plurality of target precoding matrices used for precoder cycling, to meet a requirement of the transmission scheme of precoder cycling. In this way, a higher diversity gain can be obtained, thereby helping improve data transmission reliability, and helping improve robustness of the communications system.

Figure 7:
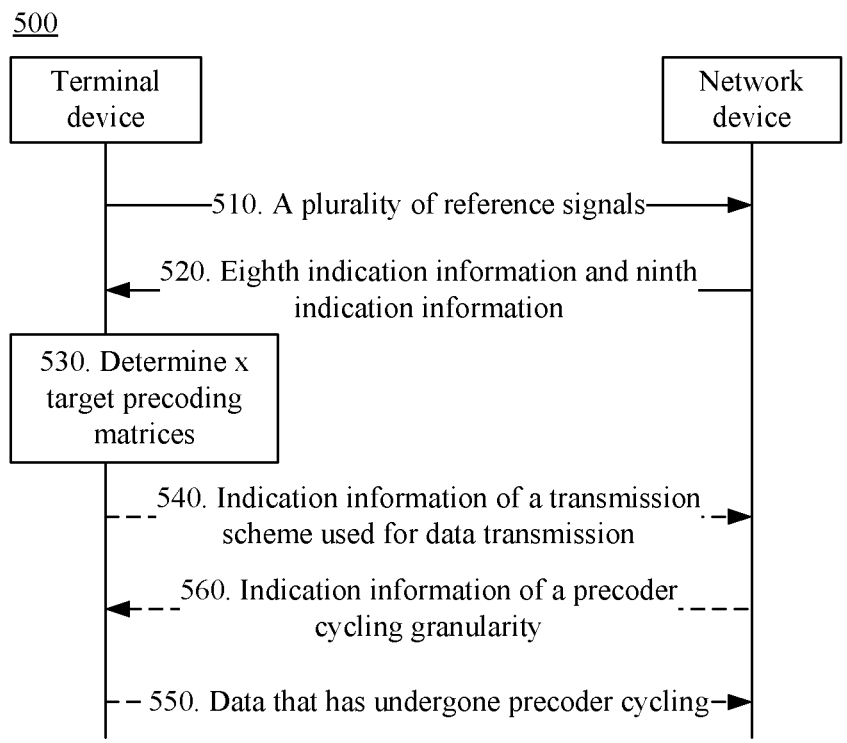
FIG. 7 is a schematic flowchart of a data transmission method according to yet another embodiment of this application.

FIG. 7 is a schematic flowchart of a data transmission method 500 according to yet another embodiment of this application from a perspective of device interaction. Specifically, FIG. 7 shows a scenario of uplink data transmission. As shown in FIG. 7, the method 500 shown in FIG. 7 may include step 510 to step 550.

In step 510, a terminal device sends a plurality of reference signals used for channel measurement.

Correspondingly, in step 510, a network device receives the plurality of reference signals used for channel measurement.

It should be understood that, a specific process of step 510 is similar to that of step 210 in the method 200. For brevity, details are not described herein again.

In step 520, the network device sends eighth indication information and ninth indication information based on the plurality of reference signals and a transmission scheme on which CSI measurement is based, where the eighth indication information and the ninth indication information are used to determine x precoding matrices.

As an example rather than a limitation, the transmission scheme on which CSI measurement is based includes: precoder cycling, precoder cycling-based space-time transmit diversity, precoder cycling-based space-frequency transmit diversity, precoder cycling-based cyclic delay diversity, or another precoder cycling-based transmission scheme.

It should be understood that, the transmission scheme on which CSI measurement is based may be understood as an assumption of a transmission scheme, and the network device performs CSI measurement and indication based on the assumptive transmission scheme.

In this embodiment of this application, a downlink channel measurement and feedback method in the LTE can also be used as a specific uplink channel measurement and indication method. For example, a precoding matrix set is first indicated by using a piece of indication information (for example, an index), and then a precoding matrix in the precoding matrix set is indicated by using a piece of indication information (for example, an index or a bitmap).

It should be understood that, a specific process of step 520 is similar to that of step 420 in the method 400. For brevity, details are not described herein again. The eighth indication information and the ninth indication information, and the third indication information and the fourth indication information in method 400 are named for distinguishing between an uplink and a downlink, and have same functions. Therefore, when receiving the eighth indication information and the ninth indication information, the network device may determine x precoding matrices based on the eighth indication information and the ninth indication information in step 530.

It should be understood that, a specific method for determining the x precoding matrices by the terminal device based on the eighth indication information and the ninth indication information in step 530 is the same as a specific method for determining the x precoding matrices by the network device based on the third indication information and the fourth indication information in step 430 in the method 400. For brevity, details are not described herein again.

Optionally, the method 500 further includes step 540: The network device sends indication information of a transmission scheme used for uplink data transmission.

Optionally, the method 500 further includes step 550: The terminal device performs precoder cycling on to-be-sent data based on the x precoding matrices, and sends data that has undergone precoder cycling.

It should be understood that, the x target precoding matrices indicated by the network device are not limited to being used to perform precoder cycling on the data. For example, after determining the x target precoding matrices based on the eighth indication information and the ninth indication information, the terminal device may further select (for example, randomly select), from the x target precoding matrices, one target precoding matrix used for performing precoding on data. This application imposes no limitation on functions of the x target precoding matrices.

Optionally, the method 500 further includes step 560: The network device sends indication information of a precoder cycling granularity.

It should be understood that, a specific process of step 540 to step 560 is similar to that of step 340 to step 360 in the method 300. For brevity, details are not described herein again.

Therefore, in this embodiment of this application, the network device sends the indication information for determining the plurality of target precoding matrices, so that the terminal device can determine, based on the indication information, the plurality of target precoding matrices used for precoder cycling, to meet a requirement of the transmission scheme of precoder cycling. In this way, a higher diversity gain can be obtained, thereby helping improve data transmission reliability, and helping improve robustness of the communications system.

It should be understood that, in various embodiments of this application, a sequence number in the foregoing processes does not indicate an execution sequence, and an execution sequence of each process is determined based on its function and internal logic, which shall not constitute any limitation to an implementation process of the embodiments of this application.

The foregoing has described the data transmission methods in the embodiments of this application in detail with reference to FIG. 3 to FIG. 7. The following describes data transmission apparatuses in the embodiments of this application in detail with reference to FIG. 8 to FIG. 11.

Figure 8:
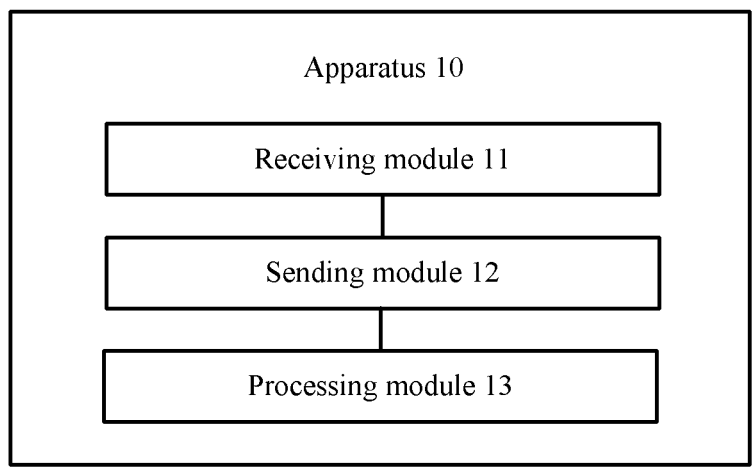
FIG. 8 is a schematic block diagram of a data transmission apparatus according to an embodiment of this application.

Based on the foregoing methods, FIG. 8 is a schematic block diagram of an apparatus 10 according to an embodiment of this application. As shown in FIG. 8, the apparatus 10 may be a terminal device, or may be a chip or a circuit, for example, a chip or a circuit that can be disposed in a terminal device. The terminal device may correspond to the terminal device in the foregoing methods.

Specifically, the apparatus 10 may be configured in a communications system including a network device and the apparatus 10, and the network device and the apparatus 10 pre-store a plurality of precoding matrices. The apparatus 10 may include a receiving module 11 and a sending module 12.

The receiving module 11 is configured to receive a plurality of reference signals used for channel measurement.

The sending module 12 is configured to send a plurality of pieces of first indication information based on the plurality of reference signals and a transmission scheme on which CSI feedback is based, where the plurality of pieces of first indication information are used to indicate x target precoding matrices, at least one of the plurality of pieces of first indication information is used to indicate one target precoding matrix, and the x target precoding matrices are determined based on the plurality of precoding matrices.

x is a quantity of target precoding matrices that need to be fed back, and x is an integer greater than 1.

Optionally, each of the at least one reference signal is a reference signal that has undergone precoder cycling, each of the plurality of pieces of first indication information is used to indicate a precoding matrix that corresponds to one of the at least one reference signal and that is at a precoder cycling granularity, a quantity of precoder cycling times is greater than or equal to 1, a quantity of precoding matrices used for precoder cycling is y, and y is an integer greater than 1.

Optionally, when y=x, each of the y precoding matrices used for precoder cycling is used to determine one of the x target precoding matrices, and the y precoding matrices are in a one-to-one correspondence with the x target precoding matrices.

Optionally, when y>x, the sending module 12 is further configured to send second indication information, where the second indication information indicates x precoding matrices in the y precoding matrices used for precoder cycling, each of the x precoding matrices used for precoder cycling is used to determine one of the x target precoding matrices, and the x precoding matrices used for precoder cycling are in a one-to-one correspondence with the x target precoding matrices.

Optionally, each of the at least one reference signal is a non-precoded reference signal, each of the plurality of pieces of first indication information includes three codebook indices, the three codebook indices in each piece of first indication information are used to jointly indicate one precoding matrix, and the plurality of pieces of first indication information are in a one-to-one correspondence with the x target precoding matrices.

Optionally, the sending module 12 is further configured to send indication information of the precoder cycling granularity.

Optionally, the receiving module 11 is further configured to receive at least one candidate value of the precoder cycling granularity.

Optionally, the receiving module 11 is further configured to receive fifth indication information, where the fifth indication information indicates the quantity x of the target precoding matrices that need to be fed back.

Optionally, the quantity x of the target precoding matrices that need to be fed back is pre-configured in the apparatus 10 and the network device.

It should be understood that, the apparatus 10 may correspond to the terminal device in the data transmission method 200 provided in the embodiment of this application, and the apparatus 10 may include modules for performing the method performed by the terminal device in the data transmission method 200 in FIG. 3. In addition, the modules in the apparatus 10 and the foregoing other operations and/or functions are separately for implementing a corresponding process of the data transmission method 200 in FIG. 3. Specifically, the receiving module 11 is configured to perform step 210, step 240 to step 260, step 270, and step 290 in the method 200, and the sending module 12 is configured to perform step 220 and step 280 in the method 200. A specific process in which the modules perform the foregoing corresponding steps has been described in detail in the method 200. For brevity, details are not described herein again.

Alternatively, the apparatus 10 may be configured in a communications system including a network device and the apparatus 10, the network device and the apparatus 10 pre-store a plurality of precoding matrix sets, and each of the plurality of precoding matrix sets includes at least one precoding matrix. The apparatus 10 may include a receiving module 11, a sending module 12, and a processing module 13.

The sending module 12 is configured to send at least one reference signal used for channel measurement.

The receiving module 11 is configured to receive a plurality of pieces of sixth indication information that are sent by the network device based on the at least one reference signal and a transmission scheme on which CSI measurement is based, where the plurality of pieces of sixth indication information are used to indicate x target precoding matrices, at least one of the plurality of pieces of sixth indication information is used to indicate one target precoding matrix, and the x target precoding matrices are determined based on the plurality of precoding matrices.

The processing module 13 is configured to determine the x target precoding matrices based on the plurality of pieces of sixth indication information.

x is a quantity of target precoding matrices that need to be indicated, and x is an integer greater than 1.

Optionally, each of the at least one reference signal is a reference signal that has undergone precoder cycling, each of the plurality of pieces of sixth indication information is used to indicate a precoding matrix that corresponds to one of the at least one reference signal and that is at a precoder cycling granularity, a quantity of precoder cycling times is greater than or equal to 1, a quantity of precoding matrices used for precoder cycling is y, and y is an integer greater than 1.

Optionally, when y=x, each of the y precoding matrices used for precoder cycling is used to determine one of the x target precoding matrices, and the y precoding matrices are in a one-to-one correspondence with the x target precoding matrices.

Optionally, when y>x, the receiving module 11 is further configured to receive seventh indication information.

The processing module 13 is further configured to determine, based on the seventh indication information, x precoding matrices from the y precoding matrices used for precoder cycling.

The processing module 13 is specifically configured to determine all of the x target precoding matrices based on the plurality of pieces of sixth indication information and all of the x precoding matrices used for precoder cycling, where the x precoding matrices used for precoder cycling are in a one-to-one correspondence with the x target precoding matrices.

Optionally, each of the at least one reference signal is a non-precoded reference signal, each of the plurality of pieces of sixth indication information includes three codebook indices, the three codebook indices in each piece of sixth indication information are used to jointly indicate one precoding matrix, and the plurality of pieces of sixth indication information are in a one-to-one correspondence with the x target precoding matrices.

Optionally, the receiving module 11 is further configured to receive indication information of precoder cycling.

Optionally, the quantity x of the target precoding matrices that need to be indicated is pre-configured in the network device and the apparatus 10.

It should be understood that, the apparatus 10 may correspond to the terminal device in the data transmission method 300 in the embodiment of this application, and the apparatus 10 may include modules for performing the method performed by the terminal device in the data transmission method 300 in FIG. 5. In addition, the modules in the apparatus 10 and the foregoing other operations and/or functions are separately for implementing a corresponding process of the data transmission method 300 in FIG. 5. Specifically, the sending module 12 is configured to perform step 310 and step 340 to step 360 in the method 300, the receiving module 11 is configured to perform step 320 in the method 300, and the processing module 13 is configured to perform step 330 in the method 300. A specific process in which the modules perform the foregoing corresponding steps has been described in detail in the method 300. For brevity, details are not described herein again.

Alternatively, the apparatus 10 may be configured in a communications system including a network device and the apparatus 10, the network device and the apparatus 10 pre-store a plurality of precoding matrix sets, and each of the plurality of precoding matrix sets includes at least one precoding matrix. The apparatus 10 may include a receiving module 11 and a sending module 12.

The receiving module 11 is configured to receive a plurality of reference signals used for channel measurement.

The sending module 12 is configured to send third indication information and fourth indication information based on the plurality of reference signals and a transmission scheme on which CSI feedback is based, where the third indication information is used to indicate a first precoding matrix set in the plurality of precoding matrix sets, and the fourth indication information is used to indicate x target precoding matrices in the first precoding matrix set, where x is a quantity of target precoding matrices that need to be fed back, and x is an integer greater than 1.

Optionally, each of the plurality of reference signals is a non-precoded reference signal, the third indication information includes two codebook indices, and the two codebook indices in the third indication information are used to jointly indicate the first precoding matrix set.

Optionally, the sending module 12 is further configured to send indication information of a precoder cycling granularity.

Optionally, the receiving module 11 is further configured to receive fifth indication information, where the fifth indication information indicates the quantity x of the target precoding matrices that need to be fed back.

Optionally, the quantity x of the target precoding matrices that need to be fed back is pre-configured in the network device and the apparatus 10. It should be understood that, the apparatus 10 may correspond to the terminal device in the data transmission method 400 in the embodiment of this application, and the apparatus 10 may include modules for performing the method performed by the terminal device in the data transmission method 400 in FIG. 6. In addition, the modules in the apparatus 10 and the foregoing other operations and/or functions are separately for implementing a corresponding process of the data transmission method 400 in FIG. 6. Specifically, the receiving module 11 is configured to perform step 410, step 440 to step 470, and step 490 in the method 400, and the sending module 12 is configured to perform step 420 and step 480 in the method 400. A specific process in which the modules perform the foregoing corresponding steps has been described in detail in the method 400. For brevity, details are not described herein again.

Alternatively, the apparatus 10 may be configured in a communications system including a network device and the apparatus 10, the network device and the apparatus 10 pre-store a plurality of precoding matrix sets, and each of the plurality of precoding matrix sets includes at least one precoding matrix. The apparatus 10 may include: a sending module 12, a receiving module 11, and a processing module 13.

The sending module 12 is configured to send a plurality of reference signals used for channel measurement.

The receiving module 11 is configured to receive eighth indication information and ninth indication information that are sent by the network device based on the plurality of reference signals and a transmission scheme on which CSI measurement is based, where the eighth indication information is used to indicate a first precoding matrix set in the plurality of precoding matrix sets, and the ninth indication information is used to indicate x target precoding matrices in the first precoding matrix set.

The processing module 13 is configured to determine the x target precoding matrices based on the eighth indication information and the ninth indication information.

x is a quantity of target precoding matrices that need to be indicated, and x is an integer greater than 1.

Optionally, each of the plurality of reference signals is a non-precoded reference signal, the eighth indication information includes two codebook indices, and the two codebook indices in the eighth indication information are used to jointly indicate the first precoding matrix set.

Optionally, the receiving module 11 is further configured to receive indication information of a precoder cycling granularity.

Optionally, the quantity x of the target precoding matrices that need to be indicated is configured in the network device and the apparatus 10.

It should be understood that, the apparatus 10 may correspond to the terminal device in the data transmission method 500 in the embodiment of this application, and the apparatus 10 may include modules for performing the method performed by the terminal device in the data transmission method 500 in FIG. 7. In addition, the modules in the apparatus 10 and the foregoing other operations and/or functions are separately for implementing a corresponding process of the data transmission method 500 in FIG. 7. Specifically, the sending module 12 is configured to perform step 510 and step 540 to step 560 in the method 500, the receiving module 11 is configured to perform step 520 in the method 500, and the processing module 13 is configured to perform step 530 in the method 500. A specific process in which the modules perform the foregoing corresponding steps has been described in detail in the method 500. For brevity, details are not described herein again.

Figure 9:
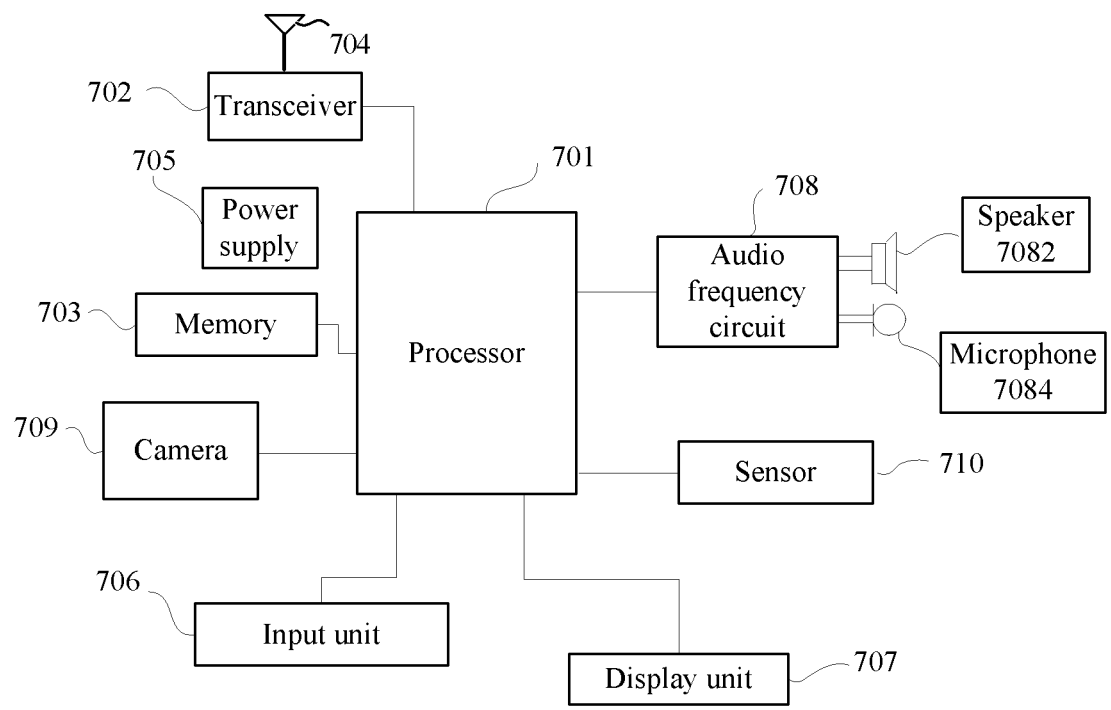
FIG. 9 is a schematic structural diagram of a terminal device according to an embodiment of this application.

FIG. 9 is a schematic structural diagram of a terminal device according to an embodiment of this application. As shown in FIG. 9, the terminal device includes a processor 701 and a transceiver 702. Optionally, the terminal device further includes a memory 703. The processor 701, the transceiver 702, and the memory 703 communicate with each other by using an external connection path, to transfer a control signal and/or a data signal. The memory 703 is configured to store a computer program. The processor 701 is configured to invoke the computer program from the memory 703 and run the computer program, to control the transceiver 702 to receive and transmit a signal.

The processor 701 and the memory 703 may be combined into a processing apparatus. The processor 701 is configured to execute program code stored in memory 703 to implement the foregoing function. During specific implementation, the memory 703 may also be integrated in the processor 701, or independent of the processor 701. The foregoing terminal device may further include an antenna 704, configured to send, by using a radio signal, uplink data or uplink control signaling that is output by the transceiver 702.

Specifically, the terminal device may correspond to the terminal device in the data transmission method 200 provided in the embodiment of this application, and the terminal device may include modules for performing the method performed by the terminal device in the data transmission method 200 in FIG. 3. In addition, the modules in the terminal device and the foregoing other operations and/or functions are separately for implementing a corresponding process of the data transmission method 200 in FIG. 3. Specifically, the memory 703 is configured to store the program code, so that when executing the program code, the processor 701 controls the transceiver 702 to perform step 210, step 220, and step 240 to step 290 in the method 200 by using the antenna 704. A specific process in which the modules perform the foregoing corresponding steps has been described in detail in the method 200. For brevity, details are not described herein again.

Alternatively, the terminal device may correspond to the terminal device in the data transmission method 300 provided in the embodiment of this application, and the terminal device may include modules for performing the method performed by the terminal device in the data transmission method 300 in FIG. 5. In addition, the modules in the terminal device and the foregoing other operations and/or functions are separately for implementing a corresponding process of the data transmission method 300 in FIG. 5. Specifically, the memory 703 is configured to store the program code, so that when executing the program code, the processor 701 controls the transceiver 702 to perform step 310, step 320, and step 340 to step 360 in the method 300 by using the antenna 704, and perform step 330. A specific process in which the modules perform the foregoing corresponding steps has been described in detail in the method 300. For brevity, details are not described herein again.

Alternatively, the terminal device may correspond to the terminal device in the data transmission method 400 provided in the embodiment of this application, and the terminal device may include modules for performing the method performed by the terminal device in the data transmission method 400 in FIG. 6. In addition, the modules in the terminal device and the foregoing other operations and/or functions are separately for implementing a corresponding process of the data transmission method 400 in FIG. 6. Specifically, the memory 703 is configured to store the program code, so that when executing the program code, the processor 701 controls the transceiver 702 to perform step 410, step 420, and step 440 to step 490 in the method 400 by using the antenna 704. A specific process in which the modules perform the foregoing corresponding steps has been described in detail in the method 400. For brevity, details are not described herein again.

Alternatively, the terminal device may correspond to the terminal device in the data transmission method 500 provided in the embodiment of this application, and the terminal device may include modules for performing the method performed by the terminal device in the data transmission method 500 in FIG. 7. In addition, the modules in the terminal device and the foregoing other operations and/or functions are separately for implementing a corresponding process of the data transmission method 500 in FIG. 7. Specifically, the memory 703 is configured to store the program code, so that when executing the program code, the processor 701 controls the transceiver 702 to perform step 510, step 520, and step 540 to step 560 in the method 500 by using the antenna 704, and perform step 530. A specific process in which the modules perform the foregoing corresponding steps has been described in detail in the method 500. For brevity, details are not described herein again.

The foregoing processor 701 may be configured to perform an action that is implemented inside the terminal and that is described in the foregoing method embodiments, and the transceiver 702 may be configured to perform a transmission or sending action that is of the terminal to the network device and that is described in the foregoing method embodiments. Refer to descriptions in the foregoing method embodiments for details, and the details are not described herein again.

The processor 701 and the memory 703 may be integrated into a processing apparatus. The processor 701 is configured to execute the program code stored in the memory 703 to implement the foregoing function. During specific implementation, the memory 703 may also be integrated into the processor 701.

The foregoing terminal device may further include a power supply 705, configured to provide power for various devices or circuits in the terminal.

In addition, to make functions of the terminal device more complete, the terminal device may further include one or more of an input unit 706, a display unit 707, an audio frequency circuit 708, a camera 709, a sensor 710, and the like. The audio frequency circuit may further include a speaker 7082, a microphone 7084, and the like.

Figure 10:
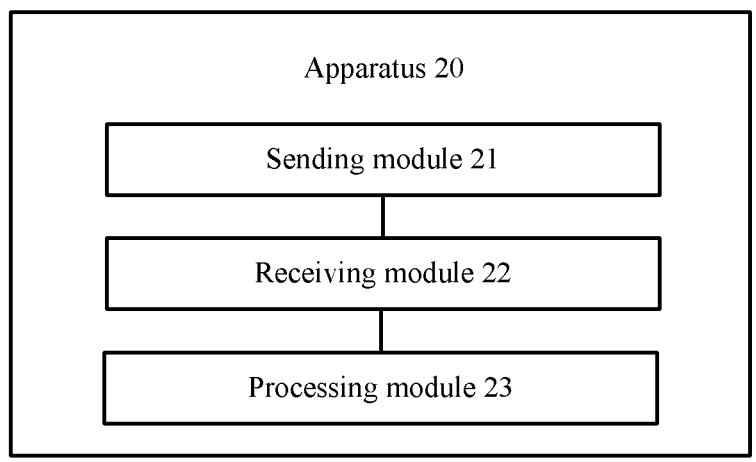
FIG. 10 is a schematic block diagram of a data transmission apparatus according to another embodiment of this application.

FIG. 10 is a schematic block diagram of an apparatus 20 according to an embodiment of this application. As shown in FIG. 10, the apparatus 20 may be a network device, or may be a chip or a circuit, for example, a chip or a circuit that can be disposed in a network device. The apparatus 20 corresponds to the network device in the foregoing methods.

Specifically, the apparatus 20 may be configured in a communications system including a terminal device and the apparatus 20. The terminal device and the apparatus 20 pre-store a plurality of precoding matrices. The apparatus 20 may include: a sending module 21, a receiving module 22, and a processing module 23.

The sending module 21 is configured to send at least one reference signal used for channel measurement.

The receiving module 22 is configured to receive a plurality of pieces of first indication information that are fed back by the terminal device based on the at least one reference signal and a transmission scheme on which CSI feedback is based, where the plurality of pieces of first indication information are used to indicate x target precoding matrices, at least one of the plurality of pieces of first indication information is used to indicate one target precoding matrix, and the x target precoding matrices are determined based on the plurality of precoding matrices.

The processing module 23 is configured to determine the x target precoding matrices based on the plurality of pieces of first indication information.

x is a quantity of target precoding matrices that need to be fed back, and x is an integer greater than 1.

Optionally, each of the at least one reference signal is a reference signal that has undergone precoder cycling, each of the plurality of pieces of first indication information is used to indicate a precoding matrix that corresponds to one of the at least one reference signal and that is at a precoder cycling granularity, a quantity of precoder cycling times is greater than or equal to 1, a quantity of precoding matrices used for precoder cycling is y, and y is an integer greater than 1.

Optionally, when y=x, the processing module 23 is specifically configured to determine all of the x target precoding matrices based on the plurality of pieces of first indication information and all of the y precoding matrices used for precoder cycling, where the y precoding matrices used for precoder cycling are in a one-to-one correspondence with the x target precoding matrices.

Optionally, when y>x, the receiving module 22 is further configured to receive second indication information.

The processing module 23 is further configured to determine, based on the second indication information, x precoding matrices from the y precoding matrices used for precoder cycling.

The processing module 23 is specifically configured to determine all of the x target precoding matrices based on the plurality of pieces of first indication information and all of the x precoding matrices used for precoder cycling, where the x precoding matrices used for precoder cycling are in a one-to-one correspondence with the x target precoding matrices.

Optionally, each of the at least one reference signal is a non-precoded reference signal, each of the plurality of pieces of first indication information includes three codebook indices, the three codebook indices in each piece of first indication information are used to jointly indicate one precoding matrix, and the plurality of pieces of first indication information are in a one-to-one correspondence with the x target precoding matrices.

Optionally, the receiving module 22 is further configured to receive indication information of the precoder cycling granularity.

Optionally, the sending module 21 is further configured to send fifth indication information, where the fifth indication information indicates the quantity x of the target precoding matrices that need to be fed back.

Optionally, the quantity x of the target precoding matrices that need to be fed back is pre-configured in the apparatus 20 and the terminal device.

It should be understood that, the apparatus 20 may correspond to the network device in the data transmission method 200 provided in the embodiment of this application, and the apparatus 20 may include modules for performing the method performed by the network device in the data transmission method 200 in FIG. 4. In addition, the modules in the apparatus 20 and the foregoing other operations and/or functions are separately for implementing a corresponding process of the data transmission method 200 in FIG. 4. Specifically, the sending module 21 is configured to perform step 210, step 240, step 270, and step 290 in the method 200, the receiving module 22 is configured to perform step 220 and step 280 in the method 200, and the processing module 23 is configured to perform step 230 in the method 200. A specific process in which the modules perform the foregoing corresponding steps has been described in detail in the method 200. For brevity, details are not described herein again.

Alternatively, the apparatus 20 may be configured in a communications system including a terminal device and the apparatus 20. The terminal device and the apparatus 20 pre-store a plurality of precoding matrices. The apparatus 20 may include a sending module 21 and a receiving module 22.

The receiving module 22 is configured to receive at least one reference signal used for channel measurement.

The sending module 21 is configured to send a plurality of pieces of sixth indication information based on the at least one reference signal and a transmission scheme on which CSI measurement is based, where the plurality of pieces of sixth indication information are used to indicate x target precoding matrices, at least one of the plurality of pieces of sixth indication information is used to indicate one target precoding matrix, and the x target precoding matrices are determined based on the plurality of precoding matrices.

x is a quantity of target precoding matrices that need to be indicated, and x is an integer greater than 1.

Optionally, each of the at least one reference signal is a reference signal that has undergone precoder cycling, each of the plurality of pieces of sixth indication information is used to indicate a precoding matrix that corresponds to one of the at least one reference signal and that is at a precoder cycling granularity, a quantity of precoder cycling times is greater than or equal to 1, a quantity of precoding matrices used for precoder cycling is y, and y is an integer greater than 1.

Optionally, when y=x, each of the y precoding matrices used for precoder cycling is used to determine one of the x target precoding matrices, and the y precoding matrices are in a one-to-one correspondence with the x target precoding matrices.

Optionally, when y>x, the sending module 21 is further configured to send seventh indication information, where the seventh indication information is used to indicate x precoding matrices in the y precoding matrices used for precoder cycling, each of the x precoding matrices used for precoder cycling is used to determine one of the x target precoding matrices, and the x precoding matrices used for precoder cycling are in a one-to-one correspondence with the x target precoding matrices.

Optionally, each of the at least one reference signal is a non-precoded reference signal, each of the plurality of pieces of sixth indication information includes three codebook indices, the three codebook indices in each piece of sixth indication information are used to jointly indicate one precoding matrix, and the plurality of pieces of sixth indication information are in a one-to-one correspondence with the x target precoding matrices.

Optionally, the sending module 21 is further configured to send indication information of the precoder cycling granularity.

Optionally, the quantity x of the target precoding matrices that need to be indicated is pre-configured in the apparatus 20 and the terminal device. It should be understood that, the apparatus 20 may correspond to the network device in the data transmission method 300 provided in the embodiment of this application, and the apparatus 20 may include modules for performing the method performed by the network device in the data transmission method 300 in FIG. 5. In addition, the modules in the apparatus 20 and the foregoing other operations and/or functions are separately for implementing a corresponding process of the data transmission method 300 in FIG. 5. Specifically, the receiving module 22 is configured to perform step 310 and step 340 to step 360 in the method 300, and the sending module 21 is configured to perform step 320 in the method 300. A specific process in which the modules perform the foregoing corresponding steps has been described in detail in the method 300. For brevity, details are not described herein again.

Alternatively, the apparatus 20 may be configured in a communications system including a terminal device and the apparatus 20. The terminal device and the apparatus 20 pre-store a plurality of precoding matrix sets, and each of the plurality of precoding matrix sets includes at least one precoding matrix. The apparatus 20 may include: a sending module 21, a receiving module 22, and a processing module 23.

The sending module 21 is configured to send a plurality of reference signals used for channel measurement.

The receiving module 22 is configured to receive third indication information and fourth indication information that are fed back by the terminal device based on the plurality of reference signals and a transmission scheme on which CSI feedback is based, where the third indication information is used to indicate a first precoding matrix set in the plurality of precoding matrix sets, and the fourth indication information is used to indicate x target precoding matrices in the first precoding matrix set.

The processing module 23 is configured to determine the x target precoding matrices based on the third indication information and the fourth indication information.

x is a quantity of target precoding matrices that need to be fed back, and x is an integer greater than 1.

Optionally, each of the plurality of reference signals is a non-precoded reference signal, the third indication information includes two codebook indices, and the two codebook indices in the third indication information are used to jointly indicate the first precoding matrix set.

Optionally, the receiving module 22 is further configured to receive indication information of a precoder cycling granularity.

Optionally, the sending module 21 is further configured to send fifth indication information, where the fifth indication information indicates the quantity x of the target precoding matrices that need to be fed back.

Optionally, the quantity x of the target precoding matrices that need to be fed back is pre-configured in the apparatus 20 and the terminal device.

It should be understood that, the apparatus 20 may correspond to the network device in the data transmission method 400 provided in the embodiment of this application, and the apparatus 20 may include modules for performing the method performed by the network device in the data transmission method 400 in FIG. 6. In addition, the modules in the apparatus 20 and the foregoing other operations and/or functions are separately for implementing a corresponding process of the data transmission method 400 in FIG. 6. Specifically, the sending module 21 is configured to perform step 410, step 440 to step 470, and step 490 in the method 400, the receiving module 22 is configured to perform step 420 and step 480 in the method 400, and the processing module 23 is configured to perform step 430 in the method 400. A specific process in which the modules perform the foregoing corresponding steps has been described in detail in the method 400. For brevity, details are not described herein again.

Alternatively, the apparatus 20 may be configured in a communications system including the terminal device and the apparatus 20. The terminal device and the apparatus 20 pre-store a plurality of precoding matrix sets, and each of the plurality of precoding matrix sets includes at least one precoding matrix. The apparatus 20 may include a sending module 21 and a receiving module 22.

The receiving module 22 is configured to receive a plurality of reference signals used for channel measurement.

The sending module 21 is configured to send eighth indication information and ninth indication information based on the plurality of reference signals and a transmission scheme on which CSI measurement is based, where the eighth indication information is used to indicate a first precoding matrix set in the plurality of precoding matrix sets, and the ninth indication information is used to indicate x target precoding matrices in the first precoding matrix set.

x is a quantity of target precoding matrices that need to be indicated, and x is an integer greater than 1.

Optionally, each of the plurality of reference signals is a non-precoded reference signal, the eighth indication information includes two codebook indices, and the two codebook indices in the eighth indication information are used to jointly indicate the first precoding matrix set.

Optionally, the sending module 21 is further configured to send indication information of a precoder cycling granularity.

Optionally, the quantity x of the target precoding matrices that need to be indicated is pre-configured in the apparatus 20 and the terminal device.

It should be understood that, the apparatus 20 may correspond to the network device in the data transmission method 500 provided in the embodiment of this application, and the apparatus 20 may include modules for performing the method performed by the network device in the data transmission method 500 in FIG. 7. In addition, the modules in the apparatus 20 and the foregoing other operations and/or functions are separately for implementing a corresponding process of the data transmission method 500 in FIG. 7. Specifically, the sending module 21 is configured to perform step 520 in the method 500, and the receiving module 22 is configured to perform step 510 and step 540 to step 560 in the method 500. A specific process in which the modules perform the foregoing corresponding steps has been described in detail in the method 500. For brevity, details are not described herein again.

Figure 11:
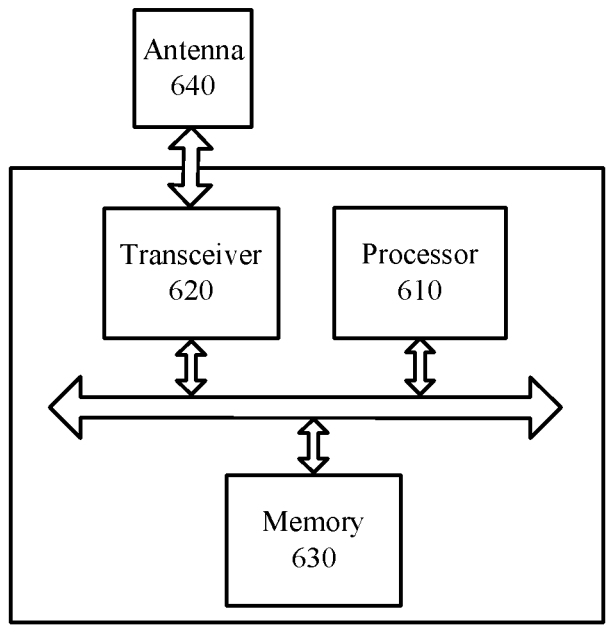
FIG. 11 is a schematic structural diagram of a network device according to another embodiment of this application.

FIG. 11 is a schematic structural diagram of a network device according to an embodiment of this application. As shown in FIG. 11, the network device includes a processor 610 and a transceiver 620. Optionally, the network device further includes a memory 630. The processor 610, the transceiver 620, and the memory 630 communicate with each other by using an external connection path, to transfer a control signal and/or a data signal. The memory 630 is configured to store a computer program. The processor 610 is configured to invoke the computer program from the memory 630 and run the computer program, to control the transceiver 620 to receive and transmit a signal.

The processor 610 and the memory 630 may be combined into a processing apparatus. The processor 610 is configured to execute program code stored in memory 630 to implement the foregoing function. During specific implementation, the memory 630 may also be integrated in the processor 610, or independent of the processor 610.

The network device may further include an antenna 640, configured to send, by using a radio signal, downlink data or downlink control signaling that is output by the transceiver 620.

Specifically, the network device may correspond to the network device in the data transmission method 200 provided in the embodiment of this application, and the network device may include modules for performing the method performed by the network device in the data transmission method 200 in FIG. 3. In addition, the modules in the network device and the foregoing other operations and/or functions are separately for implementing a corresponding process of the data transmission method 200 in FIG. 3. Specifically, the memory 630 is configured to store the program code, so that when executing the program code, the processor 610 controls the transceiver 620 to perform step 210, step 220, and step 240 to step 290 in the method 200 by using the antenna 640, and perform step 230 in the method 200. A specific process in which the modules perform the foregoing corresponding steps has been described in detail in the method 200. For brevity, details are not described herein again.

Alternatively, the network device may correspond to the network device in the data transmission method 300 provided in the embodiment of this application, and the network device may include modules for performing the method performed by the network device in the data transmission method 300 in FIG. 5. In addition, the modules in the network device and the foregoing other operations and/or functions are separately for implementing a corresponding process of the data transmission method 300 in FIG. 5. Specifically, the memory 630 is configured to store the program code, so that when executing the program code, the processor 610 controls the transceiver 620 to perform step 310, step 320, and step 340 to step 360 in the method 300 by using the antenna 640. A specific process in which the modules perform the foregoing corresponding steps has been described in detail in the method 300. For brevity, details are not described herein again.

Alternatively, the network device may correspond to the network device in the data transmission method 400 provided in the embodiment of this application, and the network device may include modules for performing the method performed by the network device in the data transmission method 400 in FIG. 6. In addition, the modules in the network device and the foregoing other operations and/or functions are separately for implementing a corresponding process of the data transmission method 400 in FIG. 6. Specifically, the memory 630 is configured to store the program code, so that when executing the program code, the processor 610 controls the transceiver 620 to perform step 410, step 420, and step 440 to step 490 in the method 400 by using the antenna 640, and perform step 430. A specific process in which the modules perform the foregoing corresponding steps has been described in detail in the method 400. For brevity, details are not described herein again.

Alternatively, the network device may correspond to the network device in the data transmission method 500 provided in the embodiment of this application, and the network device may include modules for performing the method performed by the network device in the data transmission method 500 in FIG. 7. In addition, the modules in the network device and the foregoing other operations and/or functions are separately for implementing a corresponding process of the data transmission method 500 in FIG. 7. Specifically, the memory 630 is configured to store the program code, so that when executing the program code, the processor 610 controls the transceiver 620 to perform step 510, step 520, and step 540 to step 560 in the method 500 by using the antenna 640. A specific process in which the modules perform the foregoing corresponding steps has been described in detail in the method 500. For brevity, details are not described herein again.

Figure 12:
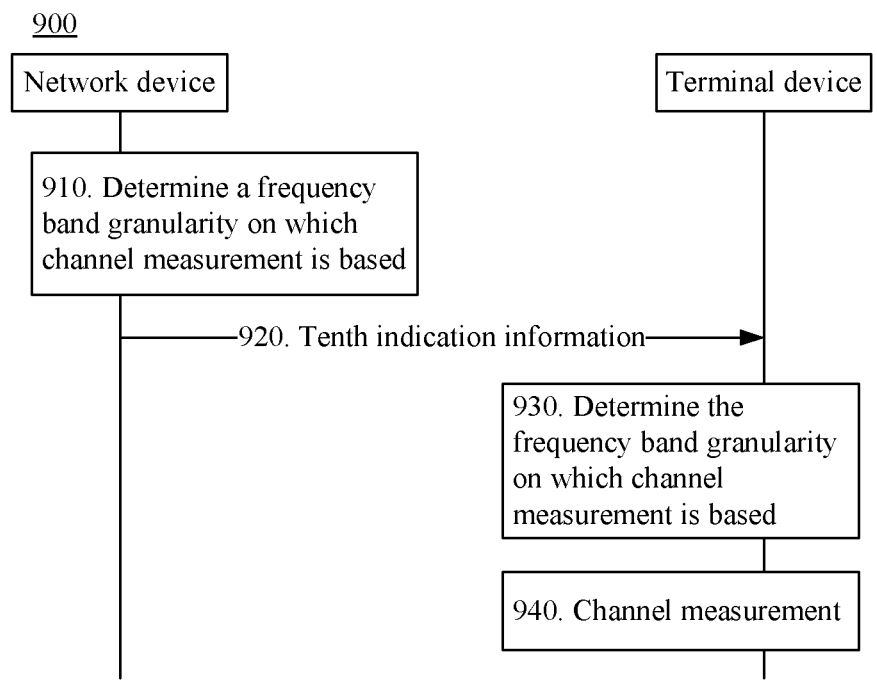
FIG. 12 is a schematic flowchart of a channel measurement indication method according to an embodiment of this application.

In another aspect, this application further provides a channel measurement indication method. FIG. 12 is a schematic flowchart of a channel measurement indication method 900 according to an embodiment of this application from a perspective of device interaction. As shown in FIG. 12, the method 900 may include step 910 to step 940.

In step 910, a network device determines a frequency band granularity on which channel measurement is based.

A frequency band of one frequency band granularity may correspond to one precoding matrix. In other words, when channel measurement is performed on bandwidth corresponding to one frequency band granularity, a same precoding matrix is used, that is, when channel measurement is performed on bandwidth corresponding to one frequency band granularity, a unique precoding matrix is used. Therefore, the frequency band granularity may be understood as a frequency band unit of channel measurement by a terminal device.

Optionally, when measurement bandwidth includes a plurality of bandwidths having a same frequency band granularity, precoding matrices corresponding to any two adjacent bandwidths having the same frequency band granularity are different.

Therefore, a width of the frequency band of the measurement frequency band may be the foregoing frequency band unit, or may be a frequency band including at least one frequency band unit. Alternatively, a width of the frequency band of the measurement frequency band may be divided into at least one frequency band, and bandwidth of any two frequency bands is one frequency band granularity. In other words, a frequency band granularity in one measurement bandwidth may be unique.

The measurement bandwidth may be bandwidth for transmitting a channel measurement reference signal, or may be bandwidth that is used for feeding back CSI after measurement. In other words, the measurement bandwidth may be all or a part of the bandwidth for transmitting the channel measurement reference signal. This application imposes no limitation on a definition of the measurement bandwidth.

The channel measurement reference signal may be a reference signal used for channel measurement, for example but not limited to, a CSI-RS or a cell reference signal (cell reference signal, CRS).

To be specific, the frequency band granularity may be understood as a frequency band unit based on which the terminal device performs channel measurement. Optionally, the frequency band granularity may be, for example but not limited to, one or more subcarriers (or a resource corresponding to one or more REs in frequency domain), a resource corresponding to one resource unit in frequency domain, a resource that corresponds to an RB group (RBG) including a plurality of resource units in frequency domain, or may be ½ resource unit, ¼ resource unit, or a precoding resource block group size (PRG size).

The resource unit may be an RB defined in an LTE protocol.

It should be understood that, sizes of the frequency band granularity listed above are merely an example used for description, and shall not constitute any limitation to this application, and this application imposes no limitation on the size of the frequency band granularity.

It should be further understood that, the foregoing precoding matrix corresponding to the frequency band granularity may be indicated by the network device in advance, or may be randomly selected by the terminal device from a codebook. This is not limited in this application.

In step 920, the network device sends tenth indication information, where the tenth indication information indicates the frequency band granularity.

Correspondingly, in step 920, the terminal device receives the tenth indication information.

Optionally, the tenth indication information may be carried in any one of the following signaling: an RRC message, a MAC-CE, or DCI.

Therefore, the foregoing frequency band granularity may be semi-statically indicated, or may be dynamically indicated. In other words, the network device may dynamically adjust, in a signaling indication manner, the frequency band granularity on which channel measurement is based.

It should be understood that, the signaling listed above for carrying the tenth indication information is merely an example used for description, and shall not constitute any limitation to this application. For example, the plurality of signaling listed above may be used in combination to indicate the frequency band granularity, or the tenth indication information may be further carried in another signaling. This application imposes no limitation on signaling for carrying the tenth indication information.

In addition, the foregoing frequency band granularity may alternatively be pre-defined, for example, defined by a protocol. The network device may indicate, by using signaling, whether to use the frequency band granularity. For example, when a field in the RRC message is set to "1", the frequency band granularity is used. In this case, the terminal device may perform channel measurement based on the frequency band granularity indicated by the network device. When the field is set to "0", the frequency band granularity is not used, that is, channel measurement is performed based on entire measurement bandwidth.

In step 930, a terminal device determines the frequency band granularity based on the tenth indication information.

Optionally, the method further includes step 940: The terminal device performs channel measurement based on the frequency band granularity.

In a specific implementation process, the foregoing channel measurement may be, for example but not limited to, calculating a channel matrix of the measurement frequency band. Specifically, based on the foregoing frequency band granularity, the terminal device may perform channel measurement on any two consecutive frequency band granularities by using different precoding matrices, and obtain a channel matrix of the frequency band by averaging channel matrices on frequency band granularities (for example, subcarriers) in the measurement frequency band. A person skilled in the art should know that, the terminal device may alternatively obtain the channel matrix of the frequency band in another manner. Refer to the prior art for a related technology of channel measurement, and this embodiment of this application imposes no limitation on a specific solution of channel measurement.

Then, the terminal device may perform precoding on the channel matrix of each frequency band granularity based on the precoding matrix corresponding to the frequency band granularity, to obtain an equivalent channel matrix of each frequency band granularity. Based on the equivalent channel matrix, the terminal device may further calculate corresponding channel state information CSI. The CSI may include at least one of the following information: a CQI, an RI, and a PMI, and is fed back to the network device.

Optionally, step 940 specifically includes: The terminal device uses the frequency band granularity as a precoder cycling granularity, and performs channel measurement based on a transmission scheme of precoder cycling.

Specifically, the terminal device may perform channel measurement based on the transmission scheme of precoder cycling. The terminal device may use, as the precoder cycling granularity, the frequency band granularity indicated by the network device. To be specific, channel measurement is performed on any two consecutive frequency band granularities by using different precoding matrices, and a plurality of precoding matrices that are in a one-to-one correspondence with a plurality of frequency band granularities may be cyclically used on a frequency band.

For content related to precoder cycling, refer to descriptions in the foregoing specification or the prior art. This embodiment of the present invention imposes no limitation on a specific solution of precoder cycling.

However, it should be understood that, that the terminal device performs channel measurement based on the transmission scheme of precoder cycling is merely a possible implementation, and the terminal device may alternatively perform channel measurement on the measurement frequency band based on a plurality of different precoding matrices and the foregoing frequency band granularity. In this case, precoding matrices corresponding to any two consecutive frequency band granularities are different. However, it may be understood that, a plurality of frequency band granularities are in a one-to-one correspondence with a plurality of precoding matrices.

Therefore, the terminal device performs channel measurement based on the frequency band granularity, so that when channel measurement is inaccurate, an equivalent channel on which precoding is performed by using a plurality of precoding matrices on the measurement bandwidth is measured, to obtain relatively accurate CSI, thereby helping improve data transmission reliability, and improving robustness of the system.

Figure 13:
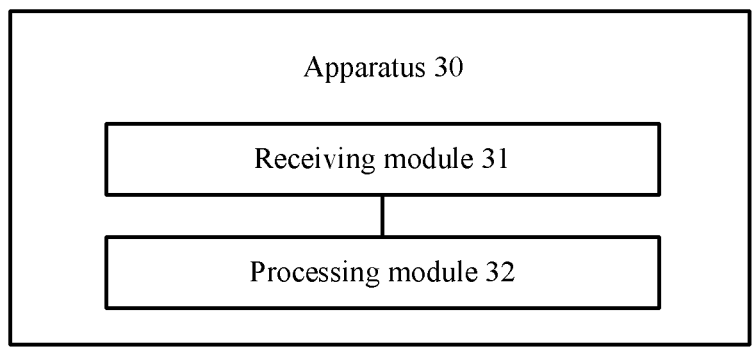
FIG. 13 is a schematic block diagram of a channel measurement indication apparatus according to an embodiment of this application.

Based on the foregoing method, an embodiment of this application further provides a channel measurement indication apparatus 30. The channel measurement indication apparatus may be a terminal device, or may be a chip or a circuit, for example, a chip or a circuit that can be disposed in a terminal device. A schematic block diagram of the channel measurement indication apparatus 30 may be shown in FIG. 13. As shown in FIG. 13, the channel measurement indication apparatus 30 includes a receiving module 31 and a processing module 32.

The receiving module 31 is configured to receive tenth indication information, where the tenth indication information indicates a frequency band granularity on which measurement is based, and a frequency band corresponding to one frequency band granularity corresponds to one precoding matrix.

The processing module 32 is configured to determine the frequency band granularity based on the tenth indication information.

Optionally, the processing module 32 is further configured to perform channel measurement based on the frequency band granularity.

Optionally, the processing module is specifically configured to use the frequency band granularity as a precoder cycling granularity, and perform channel measurement based on a transmission scheme of precoder cycling.

Optionally, precoding matrices corresponding to any two adjacent frequency bands having a same frequency band granularity are different.

Specifically, the channel measurement indication apparatus 30 may correspond to the terminal device in the channel measurement indication method 900 provided in the embodiment of this application, and the channel measurement indication apparatus 30 may include modules for performing the method performed by the terminal device in the channel measurement indication method 900 in FIG. 12. In addition, the modules in the channel measurement indication apparatus 30 and the foregoing other operations and/or functions are separately for implementing a corresponding process of the channel measurement indication method 900 in FIG. 12. Specifically, the receiving module 31 is configured to perform step 920 in the method 900, and the processing module 32 is configured to perform steps 930 and 940 in the method 900. A specific process in which the modules perform the foregoing corresponding steps has been described in detail in the method 900. For brevity, details are not described herein again.

An embodiment of this application further provides a terminal device. A schematic structural diagram of the terminal device may be shown in FIG. 9. Modules included in the terminal device have been described above with reference to FIG. 9. For brevity, details are not described herein again.

Specifically, the terminal device may correspond to the terminal device in the channel measurement indication method 900 provided in the embodiment of this application, and the terminal device may include modules for performing the method performed by the terminal device in the channel measurement indication method 900 in FIG. 12. In addition, the modules in the terminal device and the foregoing other operations and/or functions are separately for implementing a corresponding process of the channel measurement indication method 900 in FIG. 12. Specifically, the memory 703 is configured to store the program code, so that when executing the program code, the processor 701 controls the transceiver 702 to perform step 920 in the method 900 by using the antenna 704, and perform step 930 and step 940. A specific process in which the modules perform the foregoing corresponding steps has been described in detail in the method 900. For brevity, details are not described herein again.

Figure 14:
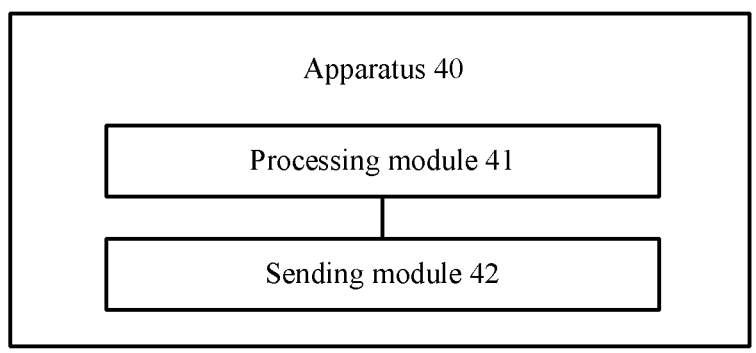
FIG. 14 is a schematic block diagram of a channel measurement indication apparatus according to an embodiment of this application.

An embodiment of this application further provides a channel measurement indication apparatus 40. The channel measurement indication apparatus 40 may be a network device, or may be a chip or a circuit, for example, a chip or a circuit that can be disposed in a network device. A schematic block diagram of the channel measurement indication apparatus 40 may be shown in FIG. 14. As shown in FIG. 14, the channel measurement indication apparatus 40 includes a processing module 41 and a sending module 42.

The processing module 41 is configured to determine a frequency band granularity on which channel measurement is based, where a frequency band corresponding to one frequency band granularity corresponds to one precoding matrix.

The sending module 42 is configured to send tenth indication information, where the tenth indication information indicates the frequency band granularity.

Optionally, precoding matrices corresponding to any two adjacent frequency bands having a same frequency band granularity are different.

Specifically, the channel measurement indication apparatus 40 may correspond to the network device in the channel measurement indication method 900 provided in the embodiment of this application, and the channel measurement indication apparatus 40 may include modules for performing the method performed by the network device in the channel measurement indication method 900 in FIG. 12. In addition, the modules in the channel measurement indication apparatus 40 and the foregoing other operations and/or functions are separately for implementing a corresponding process of the channel measurement indication method 900 in FIG. 12. Specifically, the processing module 41 is configured to perform step 910 in the method 900, and the sending module 42 is configured to perform step 920 in the method 900. A specific process in which the modules perform the foregoing corresponding steps has been described in detail in the method 900. For brevity, details are not described herein again.

An embodiment of this application further provides a network device. A schematic structural diagram of the network device may be shown in FIG. 11. Modules included in the network device have been described above with reference to FIG. 11. For brevity, details are not described herein again.

Specifically, the network device may correspond to the network device in the channel measurement indication method 900 provided in the embodiment of this application, and the network device may include modules for performing the method performed by the network device in the channel measurement indication method 900 in FIG. 12. In addition, the modules in the network device and the foregoing other operations and/or functions are separately for implementing a corresponding process of the channel measurement indication method 900 in FIG. 12. Specifically, the memory 630 is configured to store the program code, so that when executing the program code, the processor 610 performs step 910 in the method 900, and controls the transceiver 620 to perform step 920 in the method 900 by using the antenna 640. A specific process in which the modules perform the foregoing corresponding steps has been described in detail in the method 900. For brevity, details are not described herein again.

Based on the methods provided in the embodiments of this application, an embodiment of this application further provides a system. The system includes the foregoing network device and one or more terminal devices.

It should be understood that, in the embodiments of this application, the processor may be a central processing unit (central processing unit, CPU), or the processor may be another general purpose processor, a digital signal processor (digital signal processor, DSP), an application-specific integrated circuit (application specific integrated circuit, ASIC), a field programmable gate array (field programmable gate array, FPGA), or another programmable logic device, discrete gate or transistor logic device, discrete hardware component, or the like. The general purpose processor may be a microprocessor, or the processor may be any conventional processor or the like.

It should be further understood that, the memory in the embodiments of this application may be a volatile memory or a non-volatile memory, or may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and is used as an external cache. As an example but not limitative description, random access memories (random access memory, RAM) in many forms such as a static random access memory SRAM (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM) may be used.

The foregoing embodiments may be all or partly implemented by software, hardware, firmware, or any other combinations. When the foregoing embodiments are implemented by using software, the foregoing embodiments may be all or partly implemented in a form of computer program product. The computer program product includes one or more computer instructions. When the computer program instructions are loaded or executed on a computer, the processes or functions of the embodiments of this application are all or partly generated. The computer may be a general-purpose computer, a special-purpose computer, a computer network, or another programmable apparatus. The computer instruction may be stored in a computer readable storage medium, or transmitted from one computer readable storage medium to another computer readable storage medium. For example, the computer instruction may be transmitted from one website, computer, server, or data center to another website, computer, server, or data center in a wireless (such as infrared, radio, or microwave) manner. The computer readable storage medium may be any available medium accessible to a computer or a data storage device, such as a server or a data center, including one or more accessible medium sets. The accessible medium may be a magnetic medium (such as a floppy disk, a hard disk, or a magnetic tape), an optical medium (such as a DVD), or a semiconductor medium. The semiconductor medium may be a solid state disk.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that, the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may or may not be physical units, and may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in the form of a software function unit and sold or used as an independent product, the functions may be stored in a computer readable storage medium. Based on such an understanding, the technical solutions of this application essentially, or the part contributing to the prior art, or some or all of the technical solutions may be implemented in the form of a software product. The computer software product is stored in a storage medium and includes several instructions for instructing a computer device (which may be a personal computer, a server, a network device, or the like) to perform some or all of the steps of the methods described in the embodiments of this application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A channel measurement indication method comprising:
   receiving, by a terminal device, information indicating a frequency band granularity on which channel measurement is based, wherein the frequency band granularity is associated with a precoding matrix, wherein two consecutive frequency band granularities are associated with different precoding matrices, and wherein a plurality of precoding matrices are in a one-to-one correspondence with a plurality of frequency band granularities and each of the plurality of precoding matrices is cyclically used on a frequency band granularity of the plurality of frequency band granularities;

determining, by the terminal device, the frequency band granularity based on the information; and performing, by the terminal device, the channel measurement on a frequency band having the frequency band granularity based on a plurality of different precoding matrices and the frequency band granularity.

2. The method according to claim 1, wherein the method further comprises:

performing, by the terminal device, the channel measurement on a measurement bandwidth based on the frequency band granularity, the measurement bandwidth comprising a bandwidth for feeding back channel state information (CSI).

3. The method according to claim 1, wherein the frequency band granularity comprises a bandwidth size of a precoding resource block group (PRG).

4. The method according to claim 1, wherein the information is carried in any one of the following signaling: a radio resource control (RRC) message, a Media Access Control (MAC)-control element (CE), or downlink control information (DCI).

5. The method according to claim 1, wherein precoding matrices, corresponding to any two adjacent frequency bands having a same frequency band granularity, are different.

6. The method according to claim 1, wherein a one-to-one correspondence between a plurality of precoding matrices and a plurality of indices are stored in a pre-defined codebook, and wherein the one-to-one correspondence between the plurality of precoding matrices and plurality of indices are pre-defined by a network device and notified to the terminal device in advance using signaling.

7. The method according to claim 1, further comprising:

performing, by the terminal device, precoding on a channel matrix of the frequency band granularity based on a precoding matrix; and obtaining, by the terminal device, an equivalent channel matrix of the frequency band granularity.

8. The method according to claim 2, wherein the bandwidth for feeding back CSI comprises at least a portion of a bandwidth for transmitting a reference signal.

9. The method according to claim 2, wherein the performing, by the terminal device, the channel measurement on the measurement bandwidth based on the frequency band granularity comprises:

using, by the terminal device, the frequency band granularity as a precoder cycling granularity, and performing the channel measurement on the measurement bandwidth based on a transmission scheme of a precoder cycling.

10. The method according to claim 6, wherein the frequency band granularity is pre-defined by the precoding matrix of the pre-defined codebook.

11. A terminal device comprising:
a memory storing instructions; and
a processor in communication with the memory, the processor executing the instructions to:
receive information indicating a frequency band granularity on which channel measurement is based, wherein the frequency band granularity is associated with a precoding matrix, wherein two consecutive frequency band granularities are associated with different precoding matrices, and wherein a plurality of precoding matrices are in a one-to-one correspondence with a plurality of frequency band granularities and each of the plurality of precoding matrices is cyclically used on a frequency band granularity of the plurality of frequency band granularities; determine the frequency band granularity based on the information; and perform the channel measurement on a frequency band having the frequency band granularity based on a plurality of different precoding matrices and the frequency band granularity.

12. The terminal device according to claim 11, wherein the processor is further configured to perform the channel measurement on a measurement bandwidth based on the frequency band granularity, the measurement bandwidth comprising a bandwidth for feeding back channel state information (CSI).

13. The terminal device according to claim 11, wherein the frequency band granularity comprises a bandwidth size of a precoding resource block group (PRG).

14. The terminal device according to claim 11, wherein the information is carried in any one of the following signaling: a radio resource control (RRC) message, a Media Access Control (MAC)-control element (CE), or downlink control information (DCI).

15. The terminal device according to claim 11, wherein precoding matrices, corresponding to any two adjacent frequency bands having a same frequency band granularity, are different.

16. The terminal device according to claim 11, wherein a one-to-one correspondence between a plurality of precoding matrices and a plurality of indices are stored in a pre-defined codebook, and wherein the one-to-one correspondence between the plurality of precoding matrices and plurality of indices are pre-defined by a network device and notified to the terminal device in advance using signaling.

17. The terminal device according to claim 11, wherein the processor is further configured to:

perform precoding on a channel matrix of the frequency band granularity based on a precoding matrix; and obtain an equivalent channel matrix of the frequency band granularity.

18. The terminal device according to claim 12, wherein the bandwidth for feeding back CSI comprises at least a portion of a bandwidth for transmitting a reference signal.

19. The terminal device according to claim 12, wherein the processor is further configured to:

use the frequency band granularity as a precoder cycling granularity, and perform the channel measurement on the measurement bandwidth based on a transmission scheme of a precoder cycling.

20. The terminal device according to claim 16, wherein the frequency band granularity is pre-defined by the precoding matrix of the pre-defined codebook.

21. A non-transitory computer-readable medium storing computer instructions that when executed by a processor, cause the processor to:

receive information indicating a frequency band granularity on which channel measurement is based, wherein the frequency band granularity is associated with a precoding matrix, wherein two consecutive frequency band granularities are associated with different precoding matrices, and wherein a plurality of precoding matrices are in a one-to-one correspondence with a plurality of frequency band granularities and each of the plurality of precoding matrices is cyclically used on a frequency band granularity of the plurality of frequency band granularities;

determine the frequency band granularity based on the information; and perform the channel measurement on a frequency band having the frequency band granularity based on a plurality of different precoding matrices and the frequency band granularity.

22. The non-transitory computer-readable medium according to claim 21, wherein the computer instructions further cause the processor to perform the channel measurement on a measurement bandwidth based on the frequency band granularity, the measurement bandwidth comprising a bandwidth for feeding back channel state information (CSI).

23. The non-transitory computer-readable medium according to claim 21, wherein the frequency band granularity comprises a bandwidth size of a precoding resource block group (PRG).

24. The non-transitory computer-readable medium according to claim 22, wherein the bandwidth for feeding back CSI comprises at least a portion of a bandwidth for transmitting a reference signal.

* * * * *